US009208731B2

(12) United States Patent
Buckley et al.

(10) Patent No.: US 9,208,731 B2
(45) Date of Patent: Dec. 8, 2015

(54) DISPLAY APPARATUS EMPLOYING FRAME SPECIFIC COMPOSITE CONTRIBUTING COLORS

(71) Applicant: Pixtronix, Inc., San Diego, CA (US)

(72) Inventors: Edward Buckley, Melrose, MA (US); Fahri Yaras, Chelsea, MA (US); Jignesh Gandhi, Burlington, MA (US)

(73) Assignee: Pixtronix, Inc., San Diego, CA (US)

( * ) Notice: Subject to any disclaimer, the term of this patent is extended or adjusted under 35 U.S.C. 154(b) by 228 days.

(21) Appl. No.: 13/663,864

(22) Filed: Oct. 30, 2012

(65) Prior Publication Data

US 2014/0118388 A1 May 1, 2014

(51) Int. Cl.

| | |
|---|---|
| ***G06T 7/40*** | (2006.01) |
| ***G09G 3/34*** | (2006.01) |
| ***G09G 3/20*** | (2006.01) |
| *G09G 5/00* | (2006.01) |

(52) U.S. Cl.

CPC ............ *G09G 3/3433* (2013.01); *G09G 3/2022* (2013.01); *G06T 7/408* (2013.01); *G09G 3/348* (2013.01); *G09G 5/003* (2013.01); *G09G 2310/0235* (2013.01); *G09G 2330/021* (2013.01); *G09G 2340/06* (2013.01); *G09G 2340/16* (2013.01); *G09G 2360/144* (2013.01); *G09G 2360/16* (2013.01)

(58) Field of Classification Search

CPC .. G06T 7/408; G06T 5/0005; H04N 5/23219; G06K 9/00228

See application file for complete search history.

(56) References Cited

U.S. PATENT DOCUMENTS

| | | | | |
|---|---|---|---|---|
| 6,911,963 | B2 | 6/2005 | Baba et al. | |
| 6,940,529 | B2 | 9/2005 | Deering | |
| 7,421,121 | B2 * | 9/2008 | Sachs et al. | 382/167 |

(Continued)

FOREIGN PATENT DOCUMENTS

| | | | |
|---|---|---|---|
| TW | 201320053 | A | 5/2013 |
| WO | 2006077545 | A2 | 7/2006 |

(Continued)

OTHER PUBLICATIONS

Chen Y.F., et al., "Mixed Color Sequential Technique for Reducing Color Breakup and Motion Blur Effects", Journal of Display Technology, Dec. 2007, vol. 3 (4), pp. 377-385.

(Continued)

*Primary Examiner* — Maurice L McDowell, Jr.
*Assistant Examiner* — Raffi Isanians
(74) *Attorney, Agent, or Firm* — Edward A. Gordon; Foley & Lardner LLP

(57) ABSTRACT

This disclosure provides systems, methods and apparatus, including computer programs encoded on computer storage media, for displaying images using a frame-specific contributing color (FSCC). In one aspect, an input is configured to receive image data corresponding to a current image frame. Contributing color selection logic is configured, based on received image data, to obtain a FSCC for use in conjunction with a set of frame-independent contributing colors (FICCs) to generate the current image frame on a display. In addition, subframe generation logic is configured to process the received image data for the current image frame to generate at least two subframes for each of the FICCs and the obtained FSCC such that an output by the display of the generated subframes results in the display of the current image frame.

50 Claims, 23 Drawing Sheets

(56) References Cited

U.S. PATENT DOCUMENTS

| | | | | |
|---|---|---|---|---|
| 7,893,915 | B2 | 2/2011 | Woo et al. | |
| 8,345,172 | B2 | 1/2013 | Kataoka | |
| 2002/0063670 | A1 | 5/2002 | Yoshinaga et al. | |
| 2004/0257598 | A1* | 12/2004 | Fujio et al. | 358/1.9 |
| 2005/0104837 | A1 | 5/2005 | Baik et al. | |
| 2005/0146492 | A1 | 7/2005 | Baba et al. | |
| 2005/0206979 | A1 | 9/2005 | Tomizawa et al. | |
| 2006/0192792 | A1 | 8/2006 | Inazumi | |
| 2007/0064008 | A1 | 3/2007 | Childers | |
| 2007/0070296 | A1 | 3/2007 | Iwanaga | |
| 2007/0152953 | A1 | 7/2007 | Hong et al. | |
| 2007/0222743 | A1 | 9/2007 | Hirakata | |
| 2007/0268208 | A1 | 11/2007 | Okada et al. | |
| 2008/0068317 | A1 | 3/2008 | Araki et al. | |
| 2008/0095363 | A1 | 4/2008 | DiCarto et al. | |
| 2008/0246891 | A1* | 10/2008 | Russell et al. | 348/740 |
| 2008/0259099 | A1 | 10/2008 | Arai et al. | |
| 2009/0167657 | A1 | 7/2009 | Tomizawa | |
| 2009/0174789 | A1* | 7/2009 | Takeshita | 348/222.1 |
| 2009/0262148 | A1 | 10/2009 | Kimura | |
| 2010/0259552 | A1 | 10/2010 | Hsu | |
| 2010/0265281 | A1 | 10/2010 | Furukawa et al. | |
| 2011/0018891 | A1 | 1/2011 | Peng et al. | |
| 2011/0205259 | A1 | 8/2011 | Hagood, IV | |
| 2011/0255778 | A1* | 10/2011 | Hashimoto et al. | 382/166 |
| 2012/0026170 | A1 | 2/2012 | Abe et al. | |
| 2012/0182331 | A1 | 7/2012 | Hinton | |
| 2012/0287142 | A1 | 11/2012 | Fleck et al. | |
| 2012/0287144 | A1 | 11/2012 | Gandhi et al. | |
| 2012/0287168 | A1 | 11/2012 | Botzas et al. | |
| 2013/0321477 | A1 | 12/2013 | Gandhi et al. | |
| 2014/0118384 | A1 | 5/2014 | Buckley et al. | |
| 2014/0118385 | A1 | 5/2014 | Buckley et al. | |
| 2014/0118427 | A1 | 5/2014 | Buckley et al. | |

FOREIGN PATENT DOCUMENTS

| | | | |
|---|---|---|---|
| WO | 2007143340 | A2 | 12/2007 |
| WO | WO-2009157915 | A1 | 12/2009 |

OTHER PUBLICATIONS

International Search Report and Written Opinion—PCT/US2013/066873—ISA/EPO—Feb. 17, 2014.

Partial International Search Report—PCT/US20131066873—ISA/EPO—Jan. 8, 2014.

Taiwan Search Report—TW102138822—TIPO—Jun. 3, 2015.

* cited by examiner

DISPLAY APPARATUS EMPLOYING FRAME SPECIFIC COMPOSITE CONTRIBUTING COLORS

TECHNICAL FIELD

This disclosure relates to the field of displays, and in particular, to the formation of images on field sequential color (FSC)-based displays.

DESCRIPTION OF THE RELATED TECHNOLOGY

Some field sequential color (FSC)-based displays utilize an image formation process that includes four contributing colors, namely red, green, blue and white. Such image formation processes are referred to as RGBW processes. The use of white as a contributing color can reduce power consumption and mitigate some image artifacts to which FSC-based displays are prone, such as color break up (CBU). This occurs because white luminance content in an image is now formed simultaneously, rather than sequentially.

However, in some instances, depending on the image being displayed, the use of white as a contributing color can fail to decrease CBU as well as lead to additional image artifacts. Such instances arise when an image has significant regions made up of colors that are formed using only two contributing colors (other than white). For example, images that include large yellow regions (formed by combining red and green) are prone to CBU in a field-sequential color display system when employing white as a contributing color. This is because white light (which is a combination of red, green, and blue light) cannot be used to form the color yellow in an additive color display, due to white's additional blue content. Thus, the use of white as a contributing color does not provide the desired CBU reduction. Moreover, when a yellow region is displayed next to a white region using a RGBW process, the human visual system (HVS) will often perceive a very bright or very dark flickering line between the regions, even if no such line actually exists in the image. This is due to a time-varying Michelson contrast difference between the white and yellow regions; at some point in time the image will be displayed as white next to red, and in the next instant white next to green. In both cases, the Michelson contrast difference is both large and noticeable.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus. The apparatus includes an input configured to receive image data corresponding to a current image frame. The apparatus also includes contributing color selection logic configured to, based on received image data, obtain a frame-specific contributing color (FSCC) for use in conjunction with a set of frame-independent contributing colors (FICCs) to generate the current image frame on a display. In addition, the apparatus includes subframe generation logic configured to process the received image data for the current image frame to generate at least two subframes for each of the FICCs and the obtained FSCC such that an output by the display of the generated subframes results in the display of the current image frame.

In some implementations, the contributing color selection logic is configured to process the current image frame to identify a FSCC for use in display of a subsequent image frame, and to obtain the FSCC for the current image frame by retrieving a FSCC identified by the contributing color selection logic based on a prior image frame. In some other implementations, the contributing color selection logic is configured to obtain the FSCC for the current image frame by identifying a FSCC based on image data associated with the current image frame.

In some other implementations, the contributing color selection logic is configured to identify a FSCC for use in one of the current image frame and a subsequent image frame. In some other implementations, the contributing color selection logic is configured to identify the FSCC for use in one of the current image frame and a subsequent image frame by determining which of a plurality of potential FSCCs is most prevalent in the image frame. In some other implementations, the contributing color selection logic is configured to determine a prevalence of a potential FSCC in an image frame based on the relative brightness of each of the potential FSCCs.

In some other implementations, the contributing color selection logic is configured to identify the FSCC for use in one of the current image frame and a subsequent image frame by selecting between a plurality of potential FSCCs including combinations of equal levels at least two of the FICCs. In some implementations, the FICCs include red, green and blue (RGB) and the FSCC is selected from the group of colors including only yellow, cyan, magenta, and white (YCMW).

In some other implementations, the contributing color selection logic is configured to locate a set of median tristimulus values associated with a subset of the pixels in the current image frame. In some implementations, the subset of pixels includes pixels in the image frame having a luminance value that is greater than or equal to about the mean luminance value of all pixels in the image frame.

In some other implementations, the contributing color selection logic is configured to identify a FSCC for use in one of the current image frame and a subsequent image frame by identifying one of a preselected set of FSCCs having a distance in a color space closest to the color in the color space corresponding to the set of median tristimulus values. In some other implementations the contributing color selection logic is configured to compare a distance between a color corresponding to the set of median tristimulus values and one of a boundary of a color gamut and a color gamut white point.

In some other implementations, the contributing color selection logic is configured, in response to determining that the distance between the color corresponding to the set of the median tristimulus values and the boundary of the color gamut falls below a threshold, to identify as the FSCC a point on the boundary of the color gamut. In some other implementations, the contributing color selection logic is configured to, in response to determining that the distance between the color corresponding to the set of the median tristimulus values and the white point falls below a threshold, identify the white point as the FSCC.

In some other implementations, the contributing color selection logic is configured to identify a FSCC for use in a subsequent image frame such that the FSCC identified for the subsequent image frame is less than a threshold color change from the FSCC used in the current image frame. In some implementations, in response to determining that a color change between the FSCC identified for the subsequent image frame and the FSCC for the current image frame is greater than the threshold, the contributing color selection logic is configured to select a FSCC for the subsequent image frame with a lesser color change with respect to the FSCC used for the current image.

In some other implementations, the contributing color selection logic is configured to calculate the color change between the FSCC identified for the subsequent image frame and the FSCC used in the current frame by separately calculating the differences between intensities of the FICC components in the FSCCs. In some other implementations, the contributing color selection logic is configured to calculate the color change between the FSCC identified for the subsequent image frame and the FSCC used in the current frame by calculating a Euclidean distance between the FSCCs in either a tristimulus color space or a CIE color gamut. In some other implementations, in response to determining that the color change between the FSCC identified for the subsequent image frame and the FSCC for the current is greater than the threshold, the contributing color selection logic is configured to select a FSCC for the subsequent image frame with a lesser color change with respect to the FSCC used for the current image.

In some implementations, the apparatus is configured to derive the subframes for at least one FICC by deriving a color subfield for the obtained FSCC based on an initial set of FICC subfields, adjusting the initial set of color subfields based on the derived FSCC subfield, and generating the subframes for the FICC based on the adjusted FICC color subfield.

In some implementations, the subframe generation logic is configured to generate a greater number of subframes for each of the FICCs than for the obtained FSCC. In some other implementations, the subframe generation logic is configured to generate subframes for each of the FICCs according to a non-binary subframe weighting scheme. In some implementations, the subframe generation logic is configured to generate each of the subframes corresponding to the FSCC according to a binary subframe weighting scheme.

In some implementations, the apparatus further includes subfield derivation logic configured to derive the FSCC subfield and to adjust the initial set of FICC subfields based on the derived FSCC subfield. In some implementations, the subfield derivation logic is configured to determine a pixel intensity value for a pixel in the FSCC subfield by identifying the minimum intensity value for the pixel across the set of initial FICC subfields. The set of initial FICC subfields includes subfields for each of the FICCs which combine to form the FSCC. In some other implementations, the subfield derivation logic is further configured to determine the pixel intensity value for a pixel in the FSCC subfield by rounding the identified minimum intensity value down to an intensity value that can be displayed using fewer subframes than are used to display the FICC subfields. The subframes for the FSCC each have weights greater than 1.

In some other implementations, the subfield derivation logic is configured to determine pixel intensity values for the FSCC subfield by calculating an initial FSCC intensity level for each pixel in the image frame for the obtained FSCC based on the received image, and applying a spatial dithering algorithm to the calculated initial FSCC intensity levels. In some other implementations, the subfield derivation logic is configured to determine pixel intensity values for the FSCC subfield by scaling the pixel intensity values if at least one of the derived FSCC subfield and the updated FICC subfields using content adaptive backlight control (CABC) logic.

In some implementations, the apparatus further includes the display, where the display includes a plurality of display elements, a processor that is configured to communicate with the display, the processor configured to process image data, and a memory device that is configured to communicate with the processor.

In some implementations, the apparatus further includes a driver circuit configured to send at least one signal to the display, and a controller, including the contributing color selection logic and the subframe generation logic, configured to send at least a portion of the image data to the driver circuit.

In some implementations, the apparatus further includes an image source module configured to send the image data to the processor. The image source module includes at least one of a receiver, transceiver, and transmitter. In some implementations, the apparatus further includes an input device configured to receive input data and to communicate the input data to the processor.

Another innovative aspect of the subject matter described in this disclosure can be implemented in a computer readable medium storing computer executable instructions. When executed, the computer executable instructions cause the processor to receive image data corresponding to a current image frame; based on the received image data, obtain a FSCC for use in conjunction with a set of FICCs to generate the current image frame on a display; and process the received image data for the current image frame to generate at least two subframes for each of the FICCs and the obtained FSCC such that an output by the display of the generated subframes results in the display of the current image frame.

In some implementations the computer executable instructions cause the processor to process the current image frame to identify a FSCC for use in display of a subsequent image frame, and to obtain the FSCC for the current image frame by retrieving a FSCC identified by the contributing color selection logic based on a prior image frame. In some other implementations the computer executable instructions cause the processor to obtain the FSCC for the current image frame by identifying a FSCC based on image data associated with the current image frame.

In some other implementations, the computer executable instructions cause the processor to identify a FSCC for use in one of the current image frame and a subsequent image frame. In some other implementations, the computer executable instructions cause the processor to identify the FSCC for use in one of the current image frame and a subsequent image frame by determining which of a plurality of potential FSCCs is most prevalent in the image frame. In some other implementations, the computer executable instructions cause the processor to determine a prevalence of a potential FSCC in an image frame based on the relative brightness of each of the potential FSCCs.

In some other implementations, the computer executable instructions cause the processor to identify the FSCC for use in one of the current image frame and a subsequent image frame by selecting between a plurality of potential FSCCs including the combinations of equal levels of at least two of the FICCs. In some implementations, the FICCs include red, green and blue (RGB) and the FSCC is selected from the group of colors including yellow, cyan, magenta, and white (YCMW).

In some other implementations, the computer executable instructions cause the processor to locate a set of median tristimulus values associated with a subset of the pixels in the current image frame. In some implementations, the subset of pixels includes pixels in the image frame having a luminance value that is greater than or equal to about the mean luminance value of all pixels in the image frame.

In some other implementations, the computer executable instructions cause the processor to identify a FSCC for use in one of the current image frame and a subsequent image frame by identifying one of a preselected set of FSCCs having a distance in a color space closest to the color in the color space corresponding to the set of median tristimulus values. In some other implementations, the computer executable instructions cause the processor to compare a distance between a color corresponding to the set of median tristimulus values and one of a boundary of a color gamut and a color gamut white point.

In some other implementations, the computer executable instructions cause the processor, in response to determining that the distance between the color corresponding to the set of the median tristimulus values and the boundary of the color gamut falls below a threshold, to identify as the FSCC a point on the boundary of the color gamut. In some other implementations, the computer executable instructions cause the processor to, in response to determining that the distance between the color corresponding to the set of the median tristimulus values and the white point falls below a threshold, identify the white point as the FSCC.

In some other implementations, the computer executable instructions cause the processor to identify a FSCC for use in a subsequent image frame such that the FSCC identified for the subsequent image frame is less than a threshold color change from the FSCC used in the current image frame. In some other implementations, in response to the processor determining that a color change between the FSCC identified for the subsequent image frame and the FSCC for the current image frame is greater than the threshold, the computer executable instructions cause the processor to select a FSCC for the subsequent image frame with a lesser color change with respect to the FSCC used for the current image.

In some other implementations, the computer executable instructions cause the processor to calculate the color change between the FSCC identified for the subsequent image frame and the FSCC used in the current frame by separately calculating the differences between intensities of the FICC components in the FSCCs. In some other implementations, the computer executable instructions cause the processor to calculate the color change between the FSCC identified for the subsequent image frame and the FSCC used in the current frame by calculating a Euclidean distance between the FSCCs in one of a tristimulus color space and a CIE color gamut. In some other implementations, in response to the processor determining that the color change between the FSCC identified for the subsequent image frame and the FSCC for the current is greater than the threshold, the computer executable instructions cause the processor to select a FSCC for the subsequent image frame with a lesser color change with respect to the FSCC used for the current image.

In some other implementations, the computer executable instructions cause the processor to derive the subframes for at least one FICC by, deriving a color subfield for the obtained FSCC based on an initial set of FICC subfields, adjusting the initial set of color subfields based on the derived FSCC subfield, and generating the subframes for the FICC based on the adjusted FICC color subfield. In some other implementations, the computer executable instructions cause the processor to generate a greater number of subframes for each of the FICCs than for the obtained FSCC.

In some other implementations, the computer executable instructions cause the processor to generate subframes for each of the FICCs according to a non-binary subframe weighting scheme. In some other implementations, the computer executable instructions cause the processor to generate each of the subframes corresponding to the FSCC according to a binary subframe weighting scheme. In some other implementations, the computer executable instructions cause the processor to derive the FSCC subfield and to adjust the initial set of FICC subfields based on the derived FSCC subfield.

In some other implementations, the computer executable instructions cause the processor to determine a pixel intensity value for a pixel in the FSCC subfield by identifying the minimum intensity value for the pixel across the set of initial FICC subfields. The set of initial FICC subfields includes subfields for each of the FICCs which combine to form the FSCC. In some other implementations, the computer executable instructions cause the processor to determine the pixel intensity value for a pixel in the FSCC subfield by rounding the identified minimum intensity value down to an intensity value that can be displayed using fewer subframes than are used to display the FICC subfields. In some implementations, the subframes for the FSCC each have weights greater than 1.

In some other implementations, the computer executable instructions cause the processor to determine pixel intensity values for the FSCC subfield by, calculating an initial FSCC intensity level for each pixel in the image frame for the obtained FSCC based on the received image, and applying a spatial dithering algorithm to the calculated initial FSCC intensity levels.

In some other implementations, the computer executable instructions cause the processor to determine pixel intensity values for the FSCC subfield by scaling the pixel intensity values if at least one of the derived FSCC subfield and the updated FICC subfields using content adaptive backlight control (CABC) logic.

Another innovative aspect of the subject matter described in this disclosure can be implemented in an apparatus. The apparatus includes an input configured to receive image data corresponding to an image frame, where the image data includes pixel intensity values for each of three input contributing colors (ICCs). The apparatus also includes subfield derivation logic configured to process the received image data for the image frame to derive color subfields for at least five contributing colors (CCs), the five CCs including the three ICCs and at least two composite contributing colors (CCCs) formed from the combination of at least two of the ICCs, and output logic configured to output the color subfields for the at least five CCs to a plurality of display elements for display of the image frame.

In some implementations, the subfield derivation logic is configured to derive a color subfield for an ICC by, for each pixel in the subfield, determining intensity levels of the CCCs for the pixel, and subtracting from an initial intensity level for the pixel in the ICC subfield the determined intensity levels for each of the CCCs that are formed using the ICC.

In some implementations, the ICCs include red (R), green (G), and blue (B) and the at least two CCCs include white (W) and at least one of cyan (C), magenta (M), and yellow (Y). In some other implementations, the ICCs include red (R), green (G), and blue (B) and the at least two CCCs include white (W), cyan (C), magenta (M), and yellow (Y).

In some implementations, the apparatus further includes subframe generation logic configured to generate at least two subframes for each of the CC subfields. The output logic is configured to output the CC subfields by sequentially outputting the generated subframes.

In some implementations, the subframe generation logic is configured to generate a greater number of subframes for each of the ICC subfields than for at least one of the CCC subfields. In some other implementations, the subframe generation logic is configured, for at least one of the CCC subfields, to generate a least significant subframe having a greater significance than the least significant subframes it generates for each of the ICC subfields.

Another innovative aspect of the subject matter described in this disclosure can be implemented in a computer readable medium storing computer executable instructions. When executed by a processor, the computer executable instructions cause the processor to receive image data corresponding to an image frame. The image data includes pixel intensity values for each of three input contributing colors (ICCs). The computer executable instructions further cause the processor to process the received image data for the image frame to derive color subfields for at least five contributing colors (CCs), the five CCs including the three ICCs and at least two composite contributing colors (CCCs) formed from the combination of at least two of the ICCs. The computer executable instructions further cause the processor to output the color subfields for the at least five CCs to a plurality of display elements for display of the image frame.

In some other implementations, the computer executable instructions cause the processor to derive a color subfield for an ICC by, for each pixel in the subfield determining intensity levels of the CCCs for the pixel, and subtracting from an initial intensity level for the pixel in the ICC subfield the determined intensity levels for each of the CCCs that are formed using the ICC. In some implementations, the ICCs include red (R), green (G), and blue (B) and the at least two CCCs include white (W) and at least one of cyan (C), magenta (M), and yellow (Y). In some other implementations, the ICCs include red (R), green (G), and blue (B) and the at least two CCCs include white (W), cyan (C), magenta (M), and yellow (Y).

In some other implementations, the computer executable instructions cause the processor to generate at least two subframes for each of the CC subfields. The output logic is configured to output the CC subfields by sequentially outputting the generated subframes.

In some other implementations, the computer executable instructions cause the processor to generate a greater number of subframes for each of the ICC subfields than for at least one of the CCC subfields. In some other implementations, the computer executable instructions cause the processor, for at least one of the CCC subfields, to generate a least significant subframe having a greater significance than the least significant subframes it generates for each of the ICC subfields.

Another innovative aspect of the subject matter described in this disclosure can be implemented in an apparatus. The apparatus includes means for receiving image data corresponding to an image frame, where the image data includes pixel intensity values for each of three input contributing colors (ICCs). The apparatus also includes subfield derivation means for processing the received image data for the image frame to derive color subfields for at least five contributing colors (CCs), the five CCs including the three ICCs and at least two composite contributing colors (CCCs) formed from the combination of at least two of the ICCs, and output means for outputting the color subfields for the at least five CCs to a plurality of display means for display of the image frame.

In some implementations, the subfield derivation means is configured to derive a color subfield for an ICC by, for each pixel in the subfield, determining intensity levels of the CCCs for the pixel, and subtracting from an initial intensity level for the pixel in the ICC subfield the determined intensity levels for each of the CCCs that are formed using the ICC.

In some implementations, the ICCs include red (R), green (G), and blue (B) and the at least two CCCs include white (W) and at least one of cyan (C), magenta (M), and yellow (Y). In some other implementations, the ICCs include red (R), green (G), and blue (B) and the at least two CCCs include white (W), cyan (C), magenta (M), and yellow (Y).

In some implementations, the apparatus further includes subframe generation means configured to generate at least two subframes for each of the CC subfields. The output means is configured to output the CC subfields by sequentially outputting the generated subframes.

In some implementations, the subframe generation means is configured to generate a greater number of subframes for each of the ICC subfields than for at least one of the CCC subfields. In some other implementations, the subframe generation means is configured, for at least one of the CCC subfields, to generate a least significant subframe having a greater significance than the least significant subframes it generates for each of the ICC subfields.

A further innovative aspect of the subject matter described in this disclosure can be implemented in an apparatus having an input configured to receive image data corresponding to an image frame. The image data includes pixel data associated with at least three input contributing colors (ICCs). The apparatus also includes subfield derivation logic configured to derive for the received image frame a first set of color subfields corresponding to the ICCs and a second set of color subfields including a composite contributing color (CCC) subfield, and a set of replacement ICC subfields derived based on the CCC subfield. The apparatus also includes power management logic configured to calculate an energy consumption comparison between the presentation of the first and second sets of color subfields and to selectively cause the presentation of one of the first and second sets of color subfields based on the calculated energy consumption comparison.

In some implementations, the ICCs include red, green, and blue. In some other implementations, the CCC includes one of white, yellow, cyan, and magenta.

In some implementations, the power management logic is configured to cause the presentation of the second set of color subfields in response to the energy consumption comparison indication that the power consumed in presenting the first set of color subfields is greater than the product of a constant, $\beta$, and the power consumed in presenting the second set of color subfields. In some implementations, $\beta \leq 1$.

In some implementations, the apparatus is further configured to select the CCC for the image frame based on the color content of the image frame. In some other implementations, the apparatus is further configured to select the CCC for the image frame based on the color content of a previous image frame.

Another innovative aspect of the subject matter described in this disclosure can be implemented in a computer readable medium storing computer executable instructions, which when executed by a processor, cause the processor to receive image data corresponding to an image frame. The image data includes pixel data associated with at least three input contributing colors (ICCs). The computer executable instructions further cause the processor to derive for the received image frame a first set of color subfields corresponding to the ICCs and a second set of color subfields including a composite contributing color (CCC) subfield, and a set of replacement ICC subfields derived based on the CCC subfield, calculate an energy consumption comparison between the presentation of the first and second sets of color subfields, and selectively cause the presentation of one of the first and second sets of color subfields based on the calculated energy consumption comparison.

In some implementations, the ICCs include red (R), green (G), and blue (B). In some other implementations, the CCC includes one of white (W), yellow (Y), cyan (C), and magenta (M).

In some implementations, the computer executable instructions cause the processor to cause the presentation of the second set of color subfields in response to the energy consumption comparison indication that the power consumed in presenting the first set of color subfields is greater than the product of a constant, β, and the power consumed in presenting the second set of color subfields. In some implementations, β≤1.

In some implementations, the computer executable instructions cause the processor to select the CCC for the image frame based on the color content of the image frame. In some other implementations, the computer executable instructions cause the processor to select the CCC for the image frame based on the color content of a previous image frame.

Another innovative aspect of the subject matter described in this disclosure can be implemented in an apparatus having an input means for receiving image data corresponding to an image frame. The image data includes pixel data associated with at least three input contributing colors (ICCs). The apparatus also includes a subfield derivation means for deriving for the received image frame a first set of color subfields corresponding to the ICCs and a second set of color subfields including a composite contributing color (CCC) subfield, and a set of replacement ICC subfields derived based on the CCC subfield. The apparatus also includes a power management means for calculating an energy consumption comparison between the presentation of the first and second sets of color subfields and to selectively cause the presentation of one of the first and second sets of color subfields based on the calculated energy consumption comparison.

In some implementations, the power management means is configured to cause the presentation of the second set of color subfields in response to the energy consumption comparison indicating that the power consumed in presenting the first set of color subfields is greater than the product of a constant, β, and the power consumed in presenting the second set of color subfields. In some implementations, β≤1.

In some implementations, the apparatus is further configured to select the CCC for the image frame based on the color content of the image frame. In some other implementations, the apparatus is further configured to select the CCC for the image frame based on the color content of a previous image frame.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCD), organic light emitting diode (OLED) displays, electrophoretic displays, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
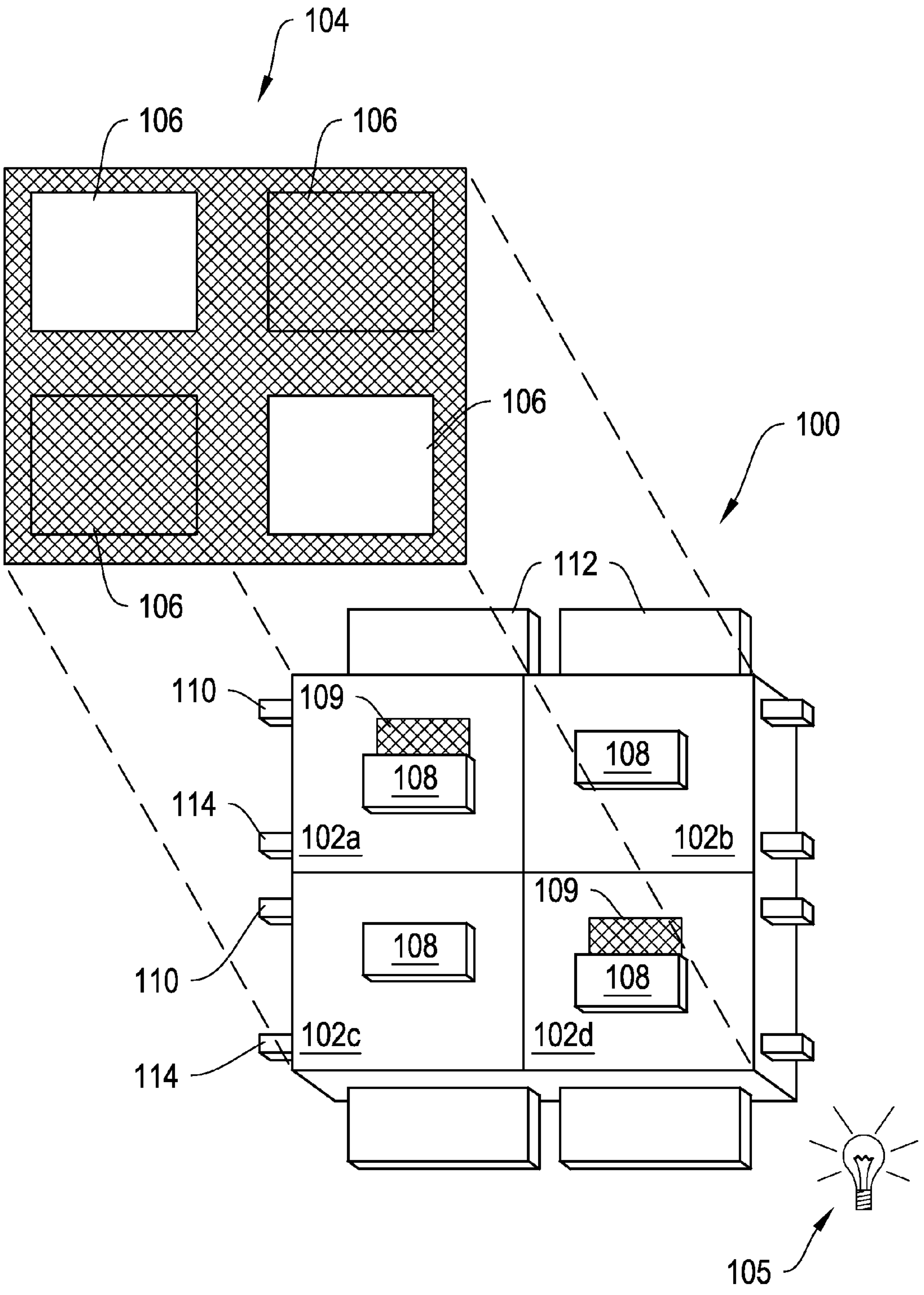
FIG. 1A shows an example schematic diagram of a direct-view microelectromechanical systems (MEMS) based display apparatus.

This disclosure relates to image formation processes and devices for implementing such processes. The image formation processes are particularly, though not exclusively, suited for use in field sequential color (FSC)-based displays. Three classes of displays that may employ FSC-based image formation processes, and therefore can take advantage of the processes and controllers disclosed herein, are liquid crystal displays (LCDs), organic light emitting diodes (OLED) displays, and electromechanical systems (EMS) displays, including nanoelectromechanical systems (NEMS), microelectromechanical systems (MEMS), and larger scale EMS displays. The devices for implementing such processes can include controllers included in display modules; other types of controllers, such as graphics controllers, memory controllers, or network interface controllers; processors in host devices that include display modules, such as televisions, mobile telephones, smart phones, laptop or tablet computers, global navigation satellite system (GNSS) devices, portable gaming devices, etc.; or in processors of standalone devices that output image data to display devices, such as desktop computers, set-top boxes, video gaming consoles, digital video recorders, etc. Each of these devices, and other similar devices, will generally be referred to herein as "controllers."

In one image formation process, a controller selects a frame-specific contributing color (FSCC) for use in conjunction with a set of frame-independent contributing colors (FICCs) to form an image frame on a display. In some implementations, the controller selects the FSCC for a current image frame based on the color content of that image frame. In some other implementations, the controller selects the FSCC for a subsequent image frame based on the color content of a current image frame.

In some implementations, the controller is configured to select one of a preselected set of potential FSCCs. For example, the controller may be configured to select between using white, yellow, magenta and cyan. In some other implementations, the controller is configured to have greater flexibility in selecting a FSCC and may select any color within an available color gamut, or within defined regions close to the boundaries of the available color gamut. In some other implementations, the controller is configured to limit the change in the FSCC from image frame to image frame.

In some implementations, the controller selects a FSCC based on the prevalence of the FSCC in an image frame. In some other implementations, the controller selects the FSCC by determining median tristimulus values for at least a subset of the pixels in an image frame. In some implementations, the controller also is configured to limit the degree to which the FSCC changes from frame to frame.

After a FSCC is selected, the controller is configured to generate a color subfield for the FSCC. The controller can generate the subfield using a variety of strategies, including a maximum replacement strategy, a reduced-subframe replacement strategy, and a fractional replacement strategy. The controller also may be configured to switch between using different replacement strategies.

The controller then uses the FSCC subfield to update an initial set of FICC subfields. In some implementations, the controller applies a spatial dithering algorithm to the derived FSCC subfield before it updates the FICCs, and uses the dithered FSCC subfield as the basis for updating the FICC subfields.

In some other implementations, instead of selecting a FSCC for each image frame, a controller is configured to derive multiple frame-independent composite contributing color (CCC) subfields for each image frame. For example, the controller may derive white, yellow, magenta, and cyan subfields for each image frame. The controller then causes an image frame to be displayed by outputting subframes corresponding to a set of input contributing color (ICC) subfields and to the derived CCC subfields.

In still some other implementations, the controller includes power management logic. The power management logic is configured to prevent the display from displaying CCC subfields (FSCC subfields or frame-independent CCC subfields) when the extra power that would be consumed in doing so does not justify their use. For example, in some implementations, the power management logic prevents a display from presenting an image using CCC subfields if doing so would require more than a predetermined degree of power beyond that necessary to present an image using only ICCs.

Particular implementations of the subject matter described in this disclosure can be implemented to realize one or more of the following potential advantages. In general, the image formation processes disclosed herein mitigate color breakup (CBU) in FSC-based displays. The image formation processes do so by transferring illumination energy away from saturated contributing colors and displaying that energy instead using one or more composite contributing colors (CCCs) that are prevalent in an image frame.

In some implementations, the CCC is selected in a frame-specific fashion, yielding a FSCC subfield targeted specifically to the image frame. This reduces energy consumption associated with generating and presenting image subframes compared to using multiple CCCs. In some implementations, the time and energy load is further decreased by presenting fewer subframes for the FSCC than are presented for a set of FICCs. In some implementations, content adaptive backlight control (CABC) logic also may be applied to dynamically set the LED intensity for one or more contributing colors for each image frame. CABC enables lower intensity, and therefore higher efficiency, LED illumination. DFC that results from using fewer subframes for a CCC can be mitigated through spatial dithering. In some other implementations, limits can be placed on the degree to which a FSCC is allowed to change from frame to frame, reducing the likelihood of introducing flicker. Using one or more of these features, image frames can be reproduced with increased power efficiency and with fewer image artifacts.

In some implementations, an FSCC is selected for an image frame based on the color content of the previous frame. This allows the subfield derivation process to be carried out in parallel with determining the FSCC to be used in the next frame. It also facilitates selection of an FSCC to be chosen without storing an image frame in a frame buffer while it is being processed for FSCC selection. In some other implementations, the FSCC is selected for an image frame based on the content of that image frame. Doing so enables a closer matching of the FSCC to the image frame, particularly for video data with rapidly changing image content.

In some other implementations, a reduced processing load approach is taken, in which multiple CCCs are illuminated for every image frame. Using multiple CCCs, in addition to a set of input contributing colors, helps reduce CBU without a processor analyzing image data every image frame to determine which CCC would be most beneficial. In addition, some images have a significant number of pixels of more than one composite contributing color. In such cases, using only one CCC may not resolve CBU sufficiently. Using multiple CCCs further mitigates such CBU for improved image quality.

FIG. 1A shows a schematic diagram of a direct-view MEMS-based display apparatus 100. The display apparatus 100 includes a plurality of light modulators 102*a*-102*d* (generally "light modulators 102") arranged in rows and columns. In the display apparatus 100, the light modulators 102*a* and 102*d* are in the open state, allowing light to pass. The light modulators 102*b* and 102*c* are in the closed state, obstructing the passage of light. By selectively setting the states of the light modulators 102*a*-102*d*, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide luminance level in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned directly on top of the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (e.g., interconnects 110, 112 and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{WE}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
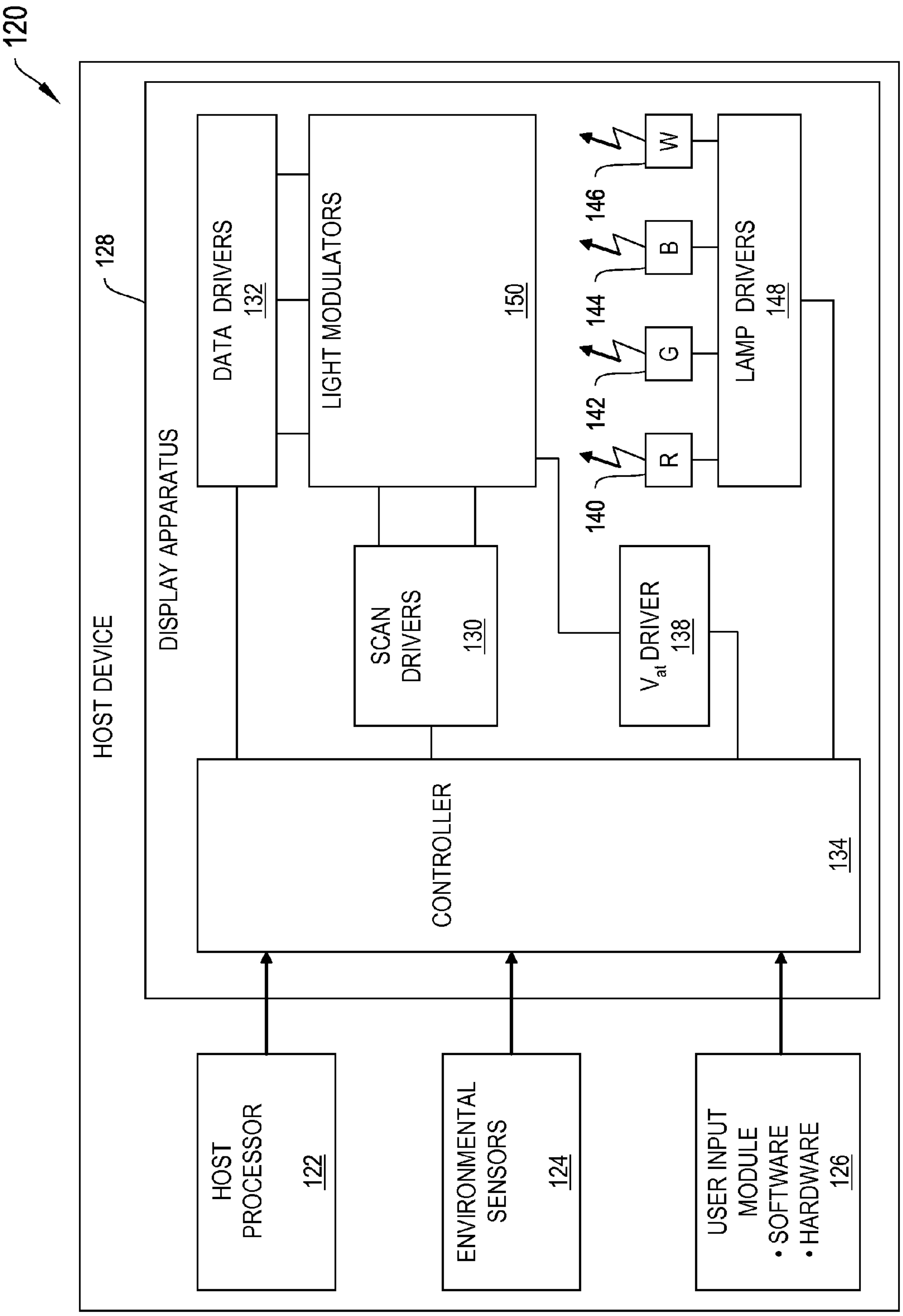
FIG. 1B shows an example block diagram of a host device.

FIG. 1B shows an example of a block diagram of a host device 120 (i.e., cell phone, smart phone, PDA, MP3 player, tablet, e-reader, netbook, notebook, etc.). The host device 120 includes a display apparatus 128, a host processor 122, environmental sensors 124, a user input module 126, and a power source.

The display apparatus 128 includes a plurality of scan drivers 130 (also referred to as "write enabling voltage sources"), a plurality of data drivers 132 (also referred to as "data voltage sources"), a controller 134, common drivers 138, lamps 140-146, lamp drivers 148 and an array 150 of display elements, such as the light modulators 102 shown in FIG. 1A. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the array 150 of display elements, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the "controller 134"). The controller sends data to the data drivers 132 in a mostly serial fashion, organized in predetermined sequences grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 114. In some other implementations, the common drivers 138, following commands from the controller 134, issue voltage pulses or signals to the array 150 of display elements, for instance global actuation pulses which are capable of driving and/or initiating simultaneous actuation of all display elements in multiple rows and columns of the array 150.

All of the drivers (e.g., scan drivers 130, data drivers 132 and common drivers 138) for different display functions are time-synchronized by the controller 134. Timing commands from the controller coordinate the illumination of red, green and blue and white lamps (140, 142, 144 and 146 respectively) via lamp drivers 148, the write-enabling and sequencing of specific rows within the array 150 of display elements, the output of voltages from the data drivers 132, and the output of voltages that provide for display element actuation. In some implementations, the lamps are light emitting diodes (LEDs).

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array 150 is synchronized with the illumination of the lamps 140, 142, 144 and 146 such that alternate image frames are illuminated with an alternating series of colors, such as red, green, and blue. The image frames for each respective color is referred to as a color subframe. In this process, referred to as the field sequential color process, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 134 forms an image by the process of time division gray scale. In some other implementations, the display apparatus 100 can provide gray scale through the use of multiple shutters 108 per pixel.

In some implementations, the data for an image state 104 is loaded by the controller 134 to the display element array 150 by a sequential addressing of individual rows, also referred to as scan lines. For each row or scan line in the sequence, the scan driver 130 applies a write-enable voltage to the write enable interconnect 110 for that row of the array 150, and subsequently the data driver 132 supplies data voltages, corresponding to desired shutter states, for each column in the selected row. This process repeats until data has been loaded for all rows in the array 150. In some implementations, the sequence of selected rows for data loading is linear, proceeding from top to bottom in the array 150. In some other implementations, the sequence of selected rows is pseudo-randomized, in order to minimize visual artifacts. And in some other implementations the sequencing is organized by blocks, where, for a block, the data for only a certain fraction of the image state 104 is loaded to the array 150, for instance by addressing only every $5^{th}$ row of the array 150 in sequence.

In some implementations, the process for loading image data to the array 150 is separated in time from the process of actuating the display elements in the array 150. In these implementations, the display element array 150 may include data memory elements for each display element in the array 150 and the control matrix may include a global actuation interconnect for carrying trigger signals, from common driver 138, to initiate simultaneous actuation of shutters 108 according to data stored in the memory elements.

In alternative implementations, the array 150 of display elements and the control matrix that controls the display elements may be arranged in configurations other than rectangular rows and columns. For example, the display elements can be arranged in hexagonal arrays or curvilinear rows and columns. In general, as used herein, the term scan-line shall refer to any plurality of display elements that share a write-enabling interconnect.

The host processor 122 generally controls the operations of the host. For example, the host processor 122 may be a general or special purpose processor for controlling a portable electronic device. With respect to the display apparatus 128, included within the host device 120, the host processor 122 outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module 126 is controlled by software in which the user programs personal preferences such as "deeper color," "better contrast," "lower power," "increased brightness," "sports," "live action," or "animation." In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device 120. The environmental sensor module 124 receives data about the ambient environment, such as temperature and or ambient lighting conditions. The sensor module 124 can be programmed to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

Figure 2A:
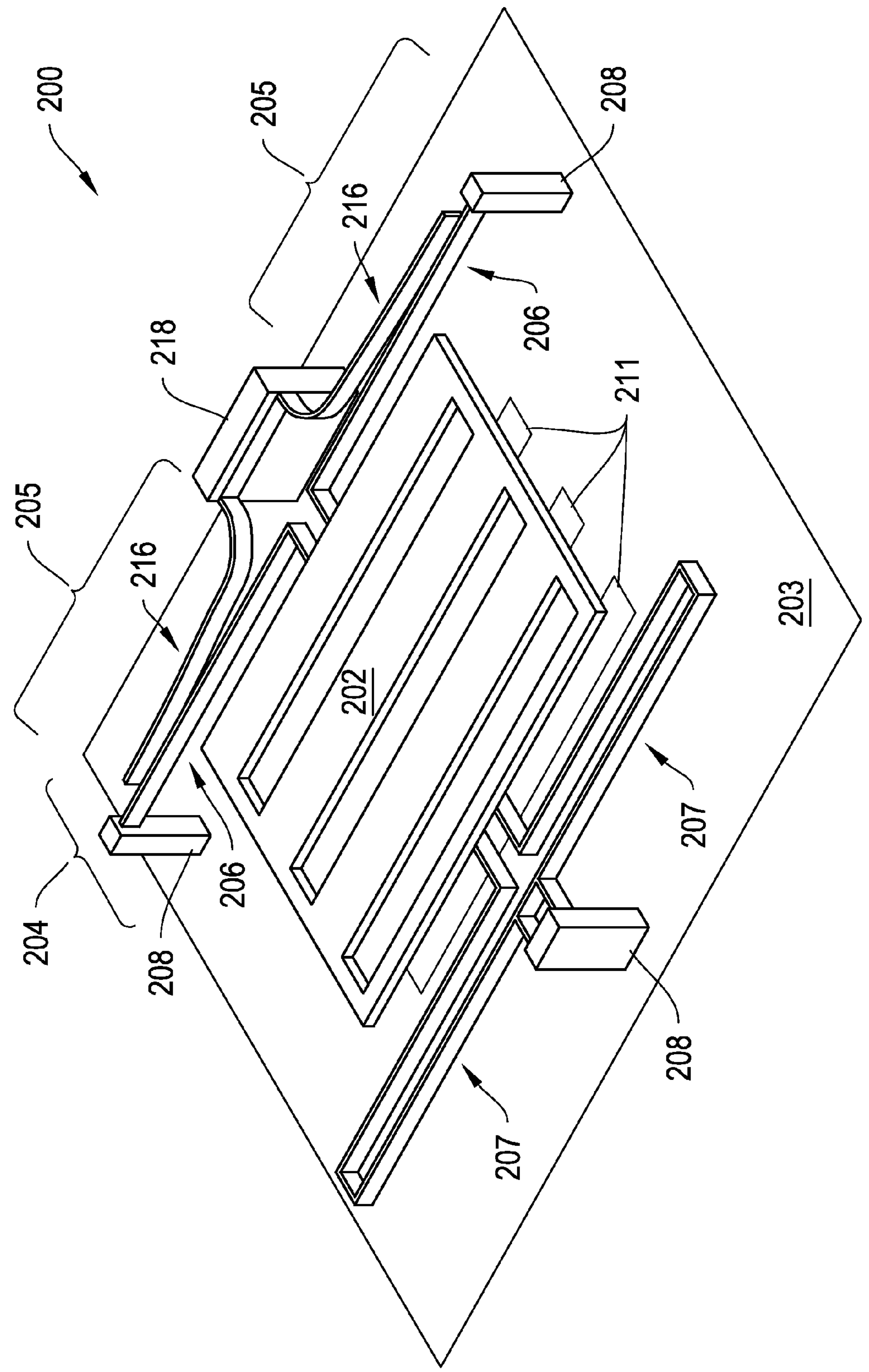
FIG. 2A shows an example perspective view of an illustrative shutter-based light modulator.

FIG. 2A shows a perspective view of an illustrative shutter-based light modulator 200. The shutter-based light modulator 200 is suitable for incorporation into the direct-view MEMS-based display apparatus 100 of FIG. 1A. The light modulator 200 includes a shutter 202 coupled to an actuator 204. The actuator 204 can be formed from two separate compliant electrode beam actuators 205 (the "actuators 205"). The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The surface 203 includes one or more aperture holes 211 for admitting the passage of light. The load anchors 208 physically connect the compliant load beams 206 and the shutter 202 to the surface 203 and electrically connect the load beams 206 to a bias voltage, in some instances, ground.

If the substrate is opaque, such as silicon, then aperture holes 211 are formed in the substrate by etching an array of holes through the substrate 204. If the substrate 204 is transparent, such as glass or plastic, then the aperture holes 211 are formed in a layer of light-blocking material deposited on the substrate 203. The aperture holes 211 can be generally circular, elliptical, polygonal, serpentine, or irregular in shape.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely toward the drive anchor 218. The compliant members 206 act as springs, such that when the voltage across the beams 206 and 216 potential is removed, the load beams 206 push the shutter 202 back into its initial position, releasing the stress stored in the load beams 206.

A light modulator, such as the light modulator 200, incorporates a passive restoring force, such as a spring, for returning a shutter to its rest position after voltages have been removed. Other shutter assemblies can incorporate a dual set of "open" and "closed" actuators and a separate set of "open" and "closed" electrodes for moving the shutter into either an open or a closed state.

There are a variety of processes by which an array of shutters and apertures can be controlled via a control matrix to produce images, in many cases moving images, with appropriate luminance levels. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve the speed, the luminance level and/or the power dissipation performance of the display.

Figure 2B:
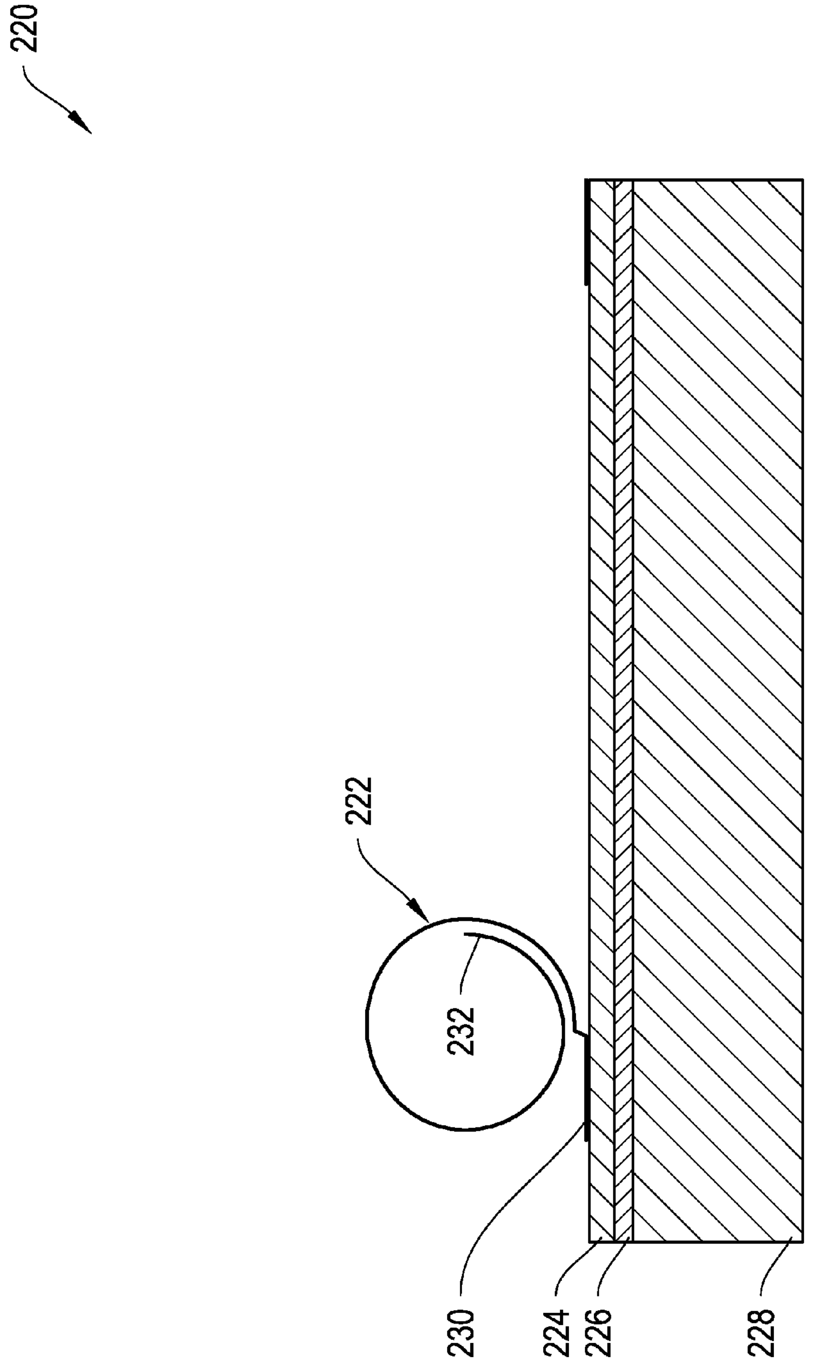
FIG. 2B shows a cross sectional view of a rolling actuator shutter-based light modulator.

The display apparatus 100, in alternative implementations, includes display elements other than transverse shutter-based light modulators, such as the shutter assembly 200 described above. For example, FIG. 2B shows a cross sectional view of a rolling actuator shutter-based light modulator 220. The rolling actuator shutter-based light modulator 220 is suitable for incorporation into an alternative implementation of the MEMS-based display apparatus 100 of FIG. 1A. A rolling actuator-based light modulator includes a movable electrode disposed opposite a fixed electrode and biased to move in a particular direction to function as a shutter upon application of an electric field. In some implementations, the light modulator 220 includes a planar electrode 226 disposed between a substrate 228 and an insulating layer 224 and a movable electrode 222 having a fixed end 230 attached to the insulating layer 224. In the absence of any applied voltage, a movable end 232 of the movable electrode 222 is free to roll towards the fixed end 230 to produce a rolled state. Application of a voltage between the electrodes 222 and 226 causes the movable electrode 222 to unroll and lie flat against the insulating layer 224, whereby it acts as a shutter that blocks light traveling through the substrate 228. The movable electrode 222 returns to the rolled state by means of an elastic restoring force after the voltage is removed. The bias towards a rolled state may be achieved by manufacturing the movable electrode 222 to include an anisotropic stress state.

Figure 2C:
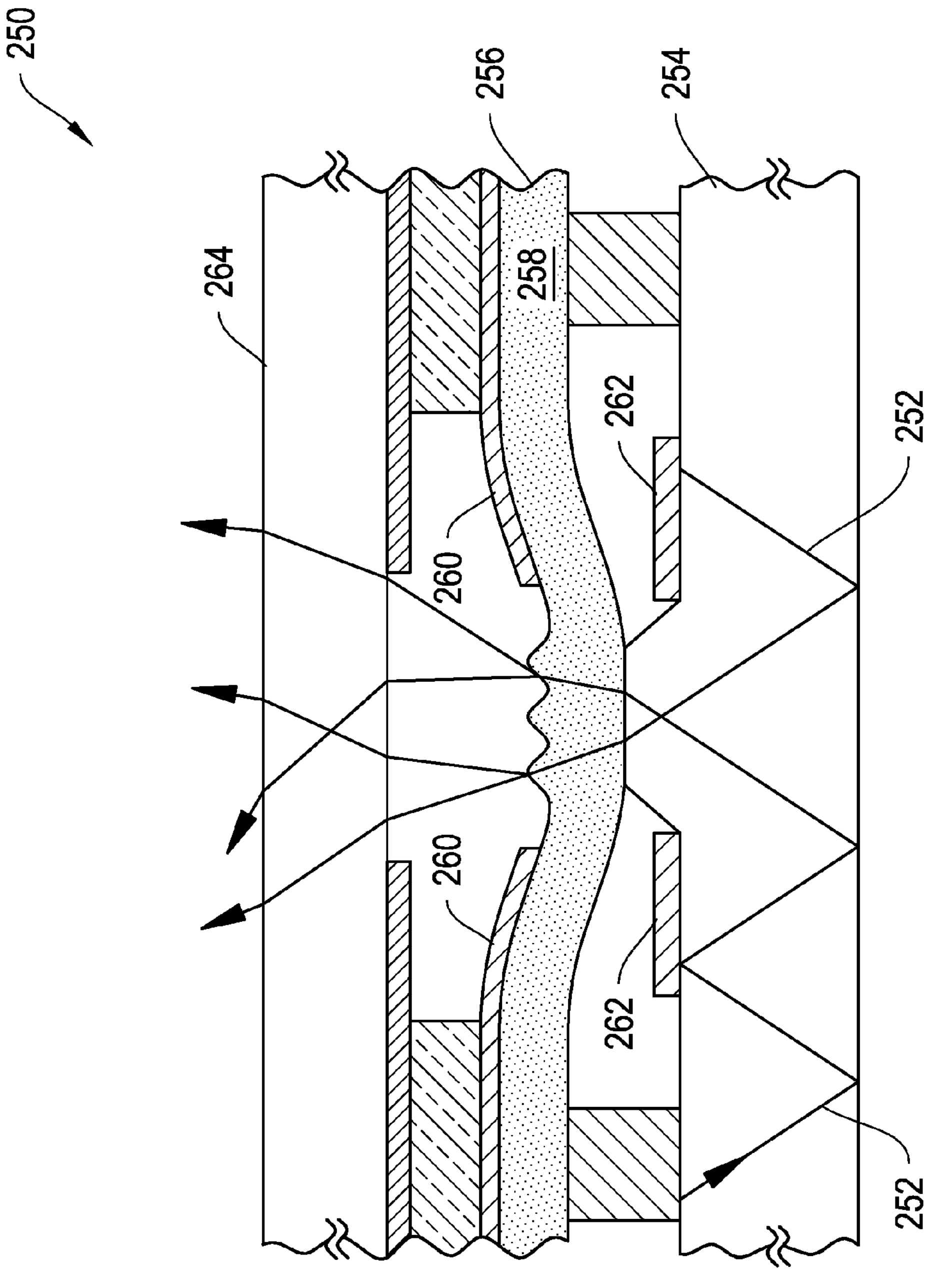
FIG. 2C shows a cross sectional view of an illustrative non shutter-based MEMS light modulator.

FIG. 2C shows a cross sectional view of an illustrative non shutter-based MEMS light modulator 250. The light tap modulator 250 is suitable for incorporation into an alternative implementation of the MEMS-based display apparatus 100 of FIG. 1A. A light tap works according to a principle of frustrated total internal reflection (TIR). That is, light 252 is introduced into a light guide 254, in which, without interference, light 252 is, for the most part, unable to escape the light guide 254 through its front or rear surfaces due to TIR. The light tap 250 includes a tap element 256 that has a sufficiently high index of refraction that, in response to the tap element 256 contacting the light guide 254, the light 252 impinging on the surface of the light guide 254 adjacent the tap element 256 escapes the light guide 254 through the tap element 256 towards a viewer, thereby contributing to the formation of an image.

In some implementations, the tap element 256 is formed as part of a beam 258 of flexible, transparent material. Electrodes 260 coat portions of one side of the beam 258. Opposing electrodes 262 are disposed on the light guide 254. By applying a voltage across the electrodes 260 and 262, the position of the tap element 256 relative to the light guide 254 can be controlled to selectively extract light 252 from the light guide 254.

Figure 2D:
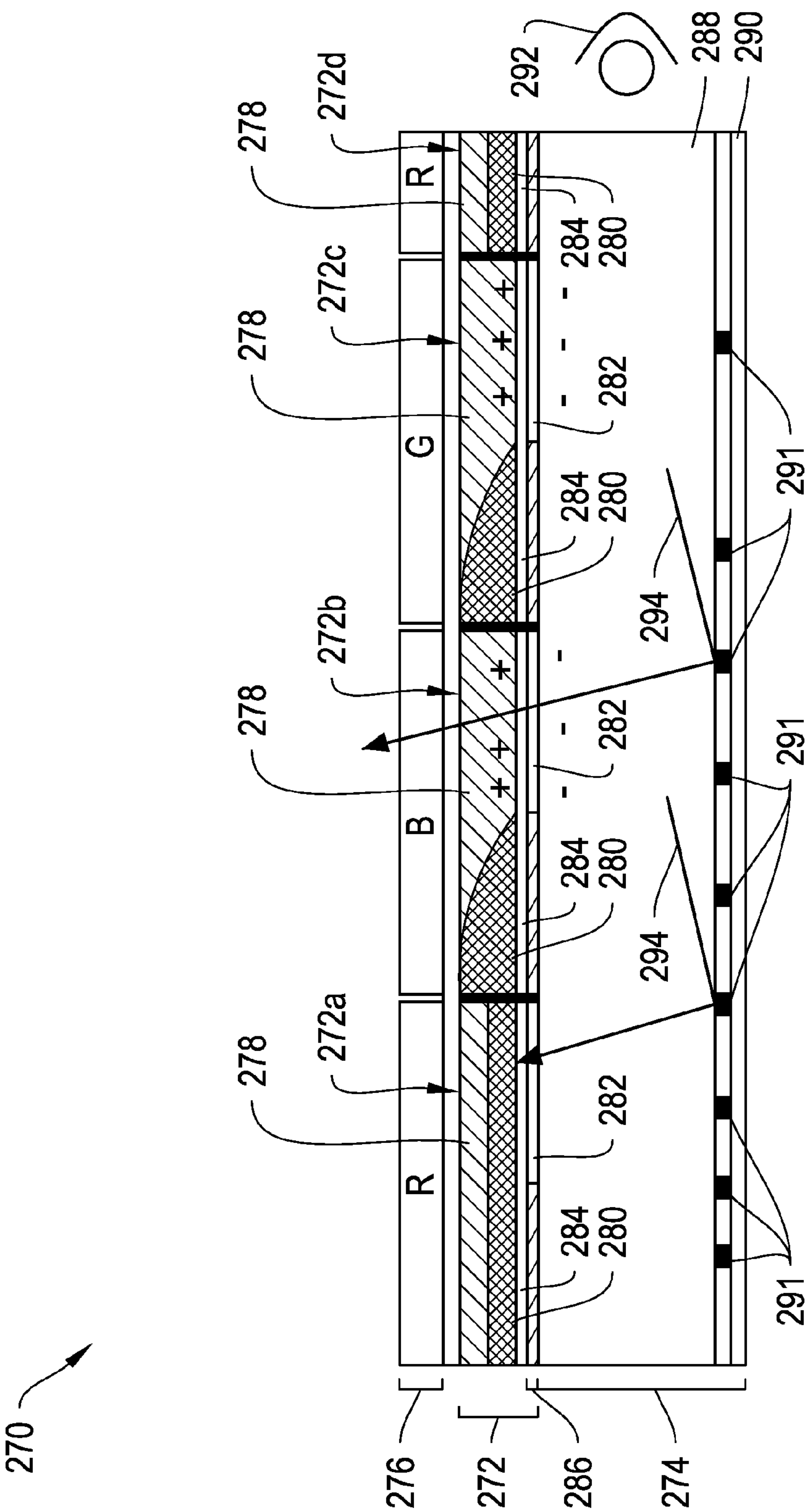
FIG. 2D shows a cross sectional view of an electrowetting-based light modulation array.

FIG. 2D shows an example cross sectional view of an electrowetting-based light modulation array 270. The electrowetting-based light modulation array 270 is suitable for incorporation into an alternative implementation of the MEMS-based display apparatus 100 of FIG. 1A. The light modulation array 270 includes a plurality of electrowetting-based light modulation cells 272*a-d* (generally "cells 272") formed on an optical cavity 274. The light modulation array 270 also includes a set of color filters 276 corresponding to the cells 272.

Each cell 272 includes a layer of water (or other transparent conductive or polar fluid) 278, a layer of light absorbing oil 280, a transparent electrode 282 (made, for example, from indium-tin oxide (ITO)) and an insulating layer 284 positioned between the layer of light absorbing oil 280 and the transparent electrode 282. In the implementation described herein, the electrode takes up a portion of a rear surface of a cell 272.

The remainder of the rear surface of a cell 272 is formed from a reflective aperture layer 286 that forms the front surface of the optical cavity 274. The reflective aperture layer 286 is formed from a reflective material, such as a reflective metal or a stack of thin films forming a dielectric mirror. For each cell 272, an aperture is formed in the reflective aperture layer 286 to allow light to pass through. The electrode 282 for the cell is deposited in the aperture and over the material forming the reflective aperture layer 286, separated by another dielectric layer.

The remainder of the optical cavity 274 includes a light guide 288 positioned proximate the reflective aperture layer 286, and a second reflective layer 290 on a side of the light guide 288 opposite the reflective aperture layer 286. A series of light redirectors 291 are formed on the rear surface of the light guide, proximate the second reflective layer. The light redirectors 291 may be either diffuse or specular reflectors. One or more light sources 292, such as LEDs, inject light 294 into the light guide 288.

In an alternative implementation, an additional transparent substrate (not shown) is positioned between the light guide 288 and the light modulation array 270. In this implementation, the reflective aperture layer 286 is formed on the additional transparent substrate instead of on the surface of the light guide 288.

In operation, application of a voltage to the electrode 282 of a cell (for example, cell 272*b* or 272*c*) causes the light absorbing oil 280 in the cell to collect in one portion of the cell 272. As a result, the light absorbing oil 280 no longer obstructs the passage of light through the aperture formed in the reflective aperture layer 286 (see, for example, cells 272*b* and 272*c*). Light escaping the backlight at the aperture is then able to escape through the cell and through a corresponding color filter (for example, red, green or blue) in the set of color filters 276 to form a color pixel in an image. When the electrode 282 is grounded, the light absorbing oil 280 covers the aperture in the reflective aperture layer 286, absorbing any light 294 attempting to pass through it.

The area under which oil 280 collects when a voltage is applied to the cell 272 constitutes wasted space in relation to forming an image. This area is non-transmissive, whether a voltage is applied or not. Therefore, without the inclusion of the reflective portions of reflective apertures layer 286, this area absorbs light that otherwise could be used to contribute to the formation of an image. However, with the inclusion of the reflective aperture layer 286, this light, which otherwise would have been absorbed, is reflected back into the light guide 290 for future escape through a different aperture. The electrowetting-based light modulation array 270 is not the only example of a non-shutter-based MEMS modulator suitable for inclusion in the display apparatus described herein. Other forms of non-shutter-based MEMS modulators could likewise be controlled by various ones of the controller functions described herein without departing from the scope of this disclosure.

Figure 3:
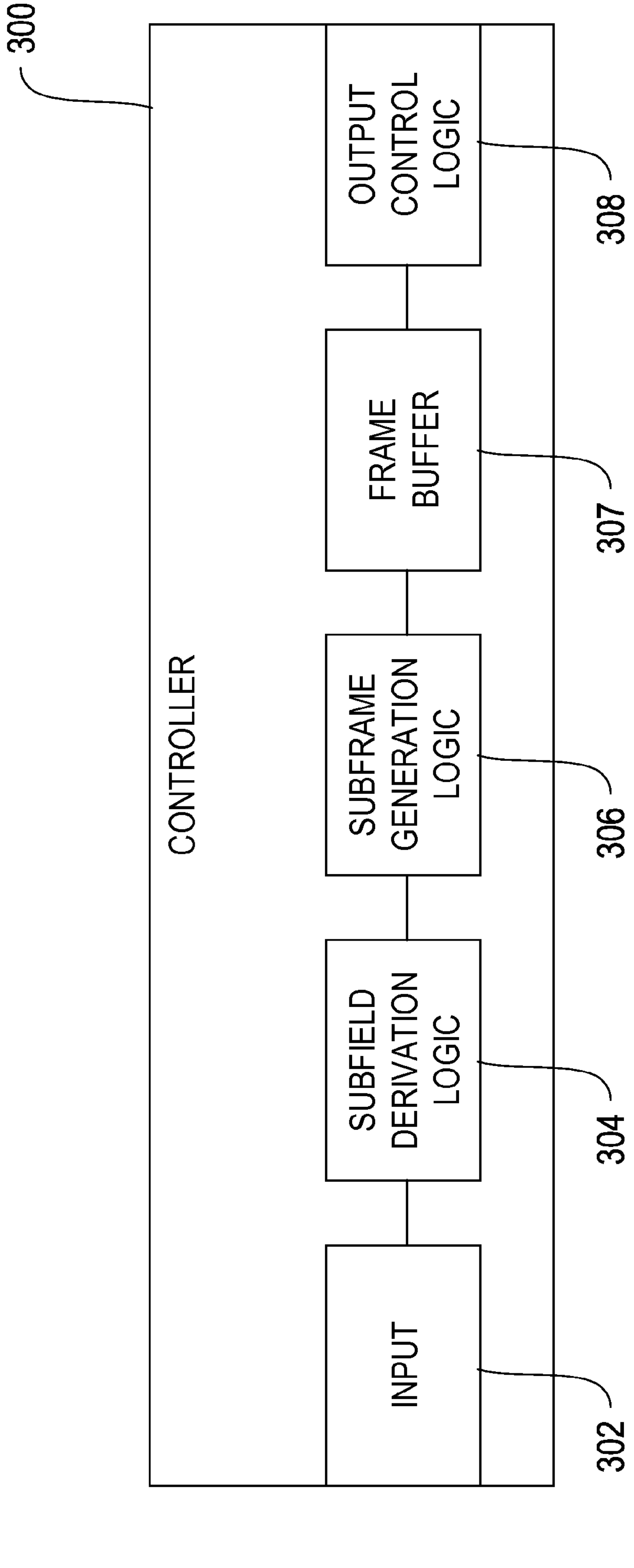
FIG. 3 shows a block diagram of an example architecture for a controller.

FIG. 3 shows a block diagram of an example architecture for a controller 300. For example, the controller 134 shown in FIG. 1B to control the display apparatus 128 may be built according to a similar architecture. In some other implementations, the controller 300 shown in FIG. 3 is implemented in the processor of a host device incorporating a display or in another standalone device that processes data for presentation on a display. The controller 300 includes an input 302, subfield derivation logic 304, subframe generation logic 306, a frame buffer 307, and output control logic 308. Together, the components carry out a process of forming an image.

The input 302 may be any type of controller input. In some implementations, the input is an external data port for receiving image data from an outside device, such as an HDMI port, a VGA port, a DVI port, a mini-DisplayPort, a coaxial cable port, or a set of component or composite video cable ports. The input 302 also may include a transceiver for receiving image data wirelessly. In some other implementations, the input 302 includes one or more data ports of a processor internal to a device. Such data ports may be configured to receive display data over a data bus from a memory device, a host processor, a transceiver, or any of the external data ports described above.

The subfield derivation logic 304, subframe generation logic 306, and the output control logic 308 can each be formed from a combination of integrated circuits, hardware, and/or firm ware. For example, one or more of the subfield derivation logic 304, subframe generation logic 306, and the output control logic 308 can be incorporated into or spread between one or more application specific integrated circuits (ASICs), field programmable gate arrays (FPGAs), or digital signal processors (DSPs). In some other implementations, some or all of the functionality of the subfield derivation logic 304, subframe generation logic 306, and the output control logic 308 may be incorporated into processor executable instructions which, when executed by a processor, such as a general purpose or special purpose processor, cause that processor to carry out the functionality described herein.

The frame buffer 307 can be any form of digital memory with read and write speeds sufficient to store and output image subframes fast enough to accommodate the processes disclosed herein. In some implantations, the frame buffer 307 is implemented as integrated circuit memory, such as DRAM or FLASH memory.

Figure 4:
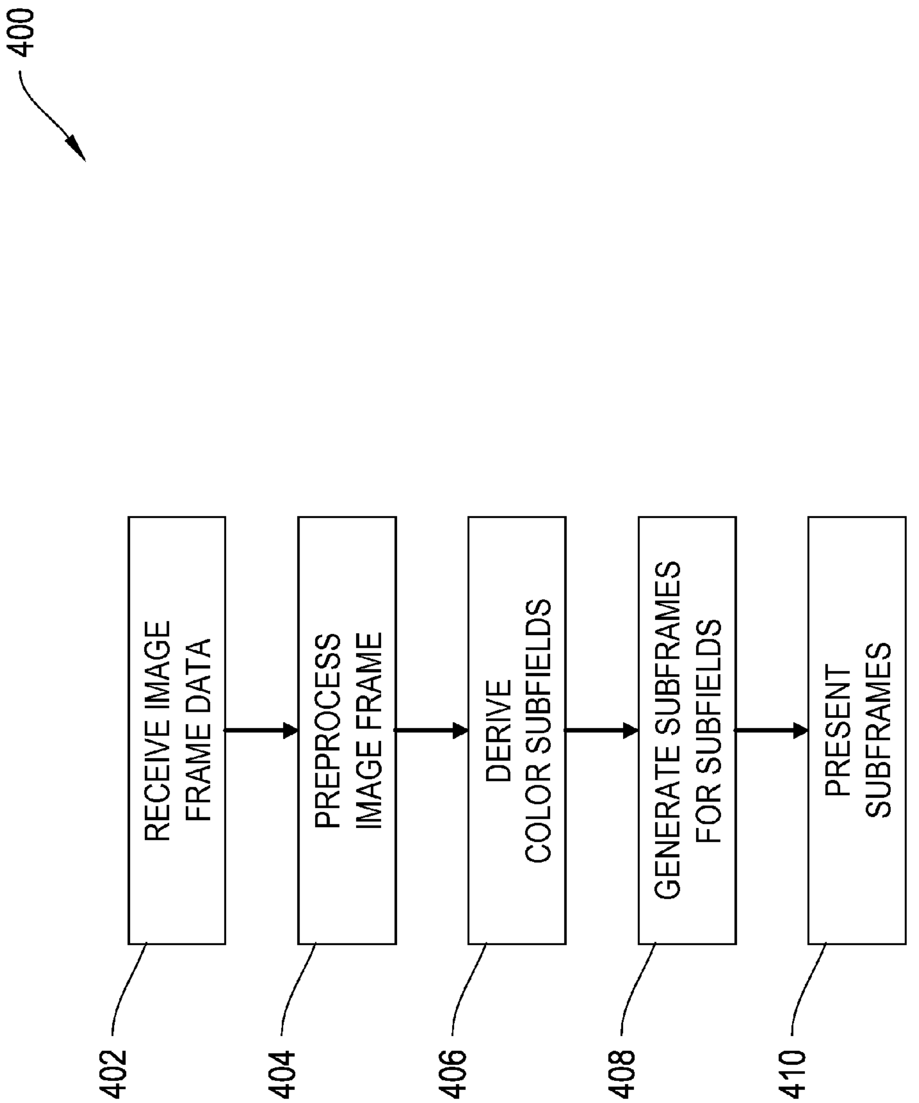
FIG. 4 shows a flow diagram of an example process of forming an image.

FIG. 4 shows a flow diagram of an example process 400 of forming an image. The process includes receiving image frame data (stage 402), preprocessing the image frame (stage 404), deriving color subfields for the image frame (stage 406), generating subframes for each color subfield (stage 408), and presenting the subframes (stage 410) using an array of display elements. Each of these stages, along with the components of the controller 300 shown in FIG. 3 are described further below.

Referring to FIGS. 1, 3 and 4, the input 302 is configured to receive image data for presentation on a display apparatus 128 (stage 402). The image data is typically received as a stream of intensity values for each of a set of input colors, such as red, green and blue, for each pixel in the display apparatus 128. The image data may be received directly from an image source, such from an electronic storage medium incorporated into the display apparatus 128. Alternatively, it may be received from a host processor 122 incorporated into the host device 120 in which the display apparatus 128 is built.

In some implementations, the received image frame data is preprocessed (stage 404) before the remainder of the image formation process 400 proceeds. For example, in some implementations, the image data includes color intensity values for more pixels or fewer pixels than are included in the display apparatus 128. In such cases, the input 302, the subfield derivation logic 304, or other logic incorporated into the controller 300 can scale the image data appropriately to the number of pixels included in the display apparatus 128. In some other implementations, the image frame data is received having been encoded assuming a given display gamma. In some implementations, if such gamma encoding is detected, logic within the controller 300 applies a gamma correction process to adjust the pixel intensity values to be more appropriate for the gamma of the display apparatus 128. For example, image data is often encoded based on the gamma of a typical liquid crystal (LCD) display. To address this common gamma encoding, the controller 300 may store a gamma correction lookup table (LUT) from which it can quickly retrieve appropriate intensity values given a set of LCD gamma encoded pixel values. In some implementations, the LUT includes corresponding RGB intensity values having a 16 bit-per-color resolution, though other color resolutions may be used in other implementations.

In some implementations, the controller 300 applies a histogram function to a received image frame as part of preprocessing the image (stage 404). The histogram function determines a variety of statistics about the image frame that can be used by other components of the controller 300. For example, in one implementation, the histogram function calculates for each FICC the mean intensity of the FICC in the image frame and the proportion of pixels that have a intensity value of 0. This histogram data can be used in selecting a FSCC as is described further below.

The controller 300 also can store a history of histogram data from frame to frame. In one implementation, histogram data from successive image frames are compared to determine if a scene change has occurred. Specifically, if the histogram data for a current frame differs beyond a threshold from the histogram data of a prior image frame, the controller determines that a scene change has occurred, and processes the current image frame accordingly. For example, in some implementations, in response to detecting a scene change, the controller 300 chooses a CABC process than it would not use absent a detected scene change.

In some implementations, image frame preprocessing (stage 404) includes a dithering stage. In some implementations, the process of de-gamma encoding an image results in 16 bit-per-color pixel values, even though the display apparatus 128 may not be configured for displaying such a large number of bits per color. A dithering process can help distribute any quantization error associated with converting these pixel values down to a color resolution available to the display, such as 6 or 8 bits per color.

In an example dithering process, the controller calculates for each pixel a difference between its initial larger number of bits representation and its quantized representation for each of the FICCs used by the display. For this example, assume the FICCs are red, green, and blue. The difference calculation can be represented as:

$$\{\Delta R,\Delta G,\Delta B\}=\{R,G,B\}-\{R^Q,G^Q,B^Q\},$$

where $R^Q$, $G^Q$, and $B^Q$ represent the quantized red, green, and blue intensity values for a pixel; R, G, and B represent the unquantized red, green, and blue intensity values; and ΔR, ΔG, and ΔB represent their respective differences. From these difference values, the controller calculates a resultant luminance error value, ΔL, for each pixel. The luminance error, ΔL, can be calculated as follows:

$$\Delta L=\Delta R\times Y_r^{gamut}+\Delta G\times Y_g^{gamut}+\Delta B\times Y_b^{gamut},$$

where $Y_r^{gamut}$, $Y_g^{gamut}$, and $Y_b^{gamut}$ represent the Y component of the tristimulus values of the red, green, and blue primaries used in the color gamut in which the display is operating. The controller 300 then identifies and applies appropriate increases to each pixel's red, green, and blue intensity values based on the determined luminance errors. In one implementation, the increases are identified using a LUT. After increasing the pixel intensity values based on the LUT, the controller 300 recalculates an updated difference between the pixels' initial unquantized value and their new quantized values. This difference for a pixel can be represented as:

$$\{\Delta R,\Delta G,\Delta B\}=\{R,G,B\}-\{R^Q+LUT_R(\Delta L),G^Q+LUT_G(\Delta L),B^Q+LUT_B(\Delta L)\},$$

where $LUT_R(\Delta L)$, $LUT_G(\Delta L)$, $LUT_B(\Delta L)$ represents the values to increase the red, green, and blue intensities for the pixel obtained from the LUT based on the previously calculated luminance error, ΔL. These new difference values represent luminance better due to the addition of color, but now include color error, which is then distributed among neighboring pixels using an error distribution algorithm. In some implementations, the error is distributed by using a Floyd-Steinberg dithering algorithm using a hard-coded 5×5 kernel. In some other implementations, other kernel sizes, and/or different dithering algorithms or dither masks are employed. As a result, luminance errors resulting from quantization are corrected for by distributing additional luminance to the FICC color channels in a distributed fashion, providing a correction that is particularly challenging for the HVS to detect.

After preprocessing is complete, the subfield derivation logic 304 processes the received image data and converts it into color subfields (stage 406), which will then be displayed to a user to recreate the image encoded in the image data. In some implementations, the subfield derivation logic 304 may dynamically select one or more composite colors to use in addition to the input colors to form any given image frame. A composite color is a color formed from the combination of two or more input colors. For example, yellow is a composite of red and green, and white is a composite of red, green and blue. In some other implementations, the subfield derivation logic 304 is preconfigured to use two or more composite colors in addition to the input colors to form an image. In still some other implementations, the subfield derivation logic 304 is configured to determine for each image frame whether or not to use any composite colors to form the image depending on whether such use would result in a power savings. In each of these implementations, the subfield derivation logic 304 generates for each pixel being displayed a set of intensity values for each color used to form the image (referred to generally as a "contributing color"). Further details about each of these implementations is provided below.

The subframe generation logic 306 takes the color subfields derived by the subfield derivation logic 304 and generates a set of subframes (stage 408) that can be loaded into an array of display elements, such as the array 150 of display elements shown in FIG. 1B, to reproduce the image encoded in the received image data. For a binary display, in which each display element can only be placed into two states, ON or OFF, the subframe generation logic 306 generates a set of bitplanes.

Each bitplane identifies the desired states of each of the display elements in the array for a given subframe. To increase the number of grayscale values that can be achieved with a reduced number of bitplanes, the subframe generation logic 306 assigns each subframe a weight. In some implementations, each bitplane is assigned a weight according to a binary weighting scheme in which each successive subframe for a given color is assigned a weight that is twice that of the subframe having the next lowest weight, for example, 1, 2, 4, 8, 16, 32, etc. In some other implementations, weights are allocated to subframes associated with one or more colors according to a non-binary weighting scheme. Such non-binary weighting schemes may include multiple subframes having the same weight and/or subframes whose weights are more or less than twice the weight of subframe having the next lowest weight.

To generate a subframe (stage 408), the subframe generation logic 306 translates a color intensity value into a binary string of 1s and 0s, referred to as a codeword. The 1s and 0s represent the desired states of a given display element in each subframe for the color for the image frame. In some implementations, the subframe generation logic 306 includes or accesses a LUT that associates each intensity value with a codeword. The codewords for each color for each pixel are then stored in the frame buffer 307.

The output control logic 308 is configured to control the output of signals to a remainder of the components of a display apparatus to cause the subframes generated by the subframe generation logic 306 to be presented to a viewer (stage 410). For example, if used in the display apparatus 128 shown in FIG. 1B, the output control logic 308 would control the output of signals to the data drivers 132, scan drivers 130 and lamp drivers 148 shown in FIG. 1B to load the bitplanes into the display elements in the array 150, and then to illuminate the display elements with the lamps 140, 142, 144 and 146. The output control logic 308 includes scheduling data indicating the times at which each of the subframes generated by the subframe generation logic 308 should be output to the data drivers 132, when the scan drivers 130 should be triggered, and when each of the lamp drivers 148 should be triggered.

Figure 5:
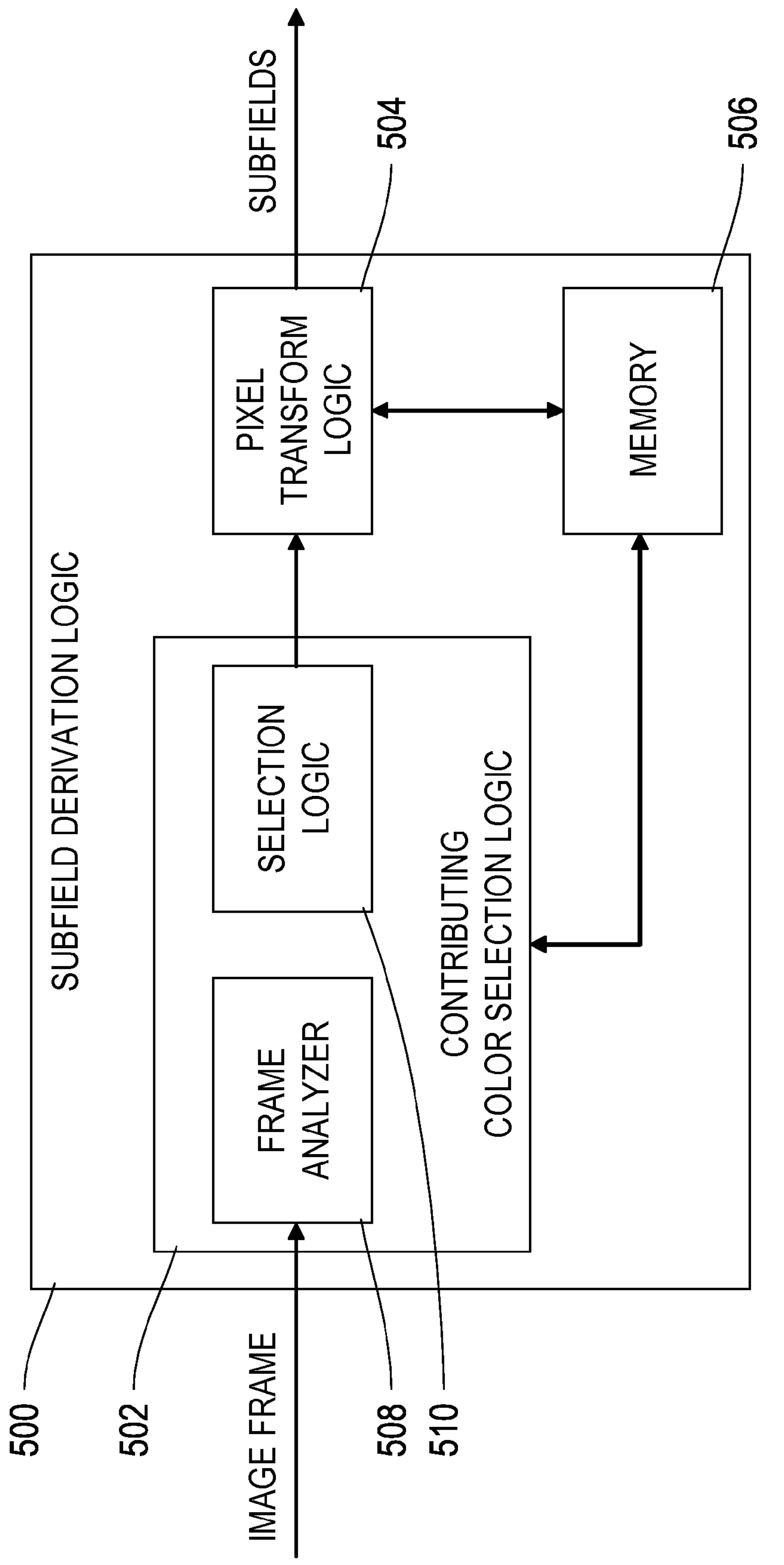
FIG. 5 shows a block diagram of an example subfield derivation logic.

FIG. 5 shows a block diagram of an example subfield derivation logic 500. The subfield derivation logic 500 includes a contributing color selection logic 502, pixel transform logic 504, and memory 506. The subfield derivation logic 500 is configured to generate a set of color subfields to present to a viewer for each received image frame using a dynamically selected FSCC along with a set of FICCs. One process for deriving such color subfields is shown in FIG. 6.

Figure 6:
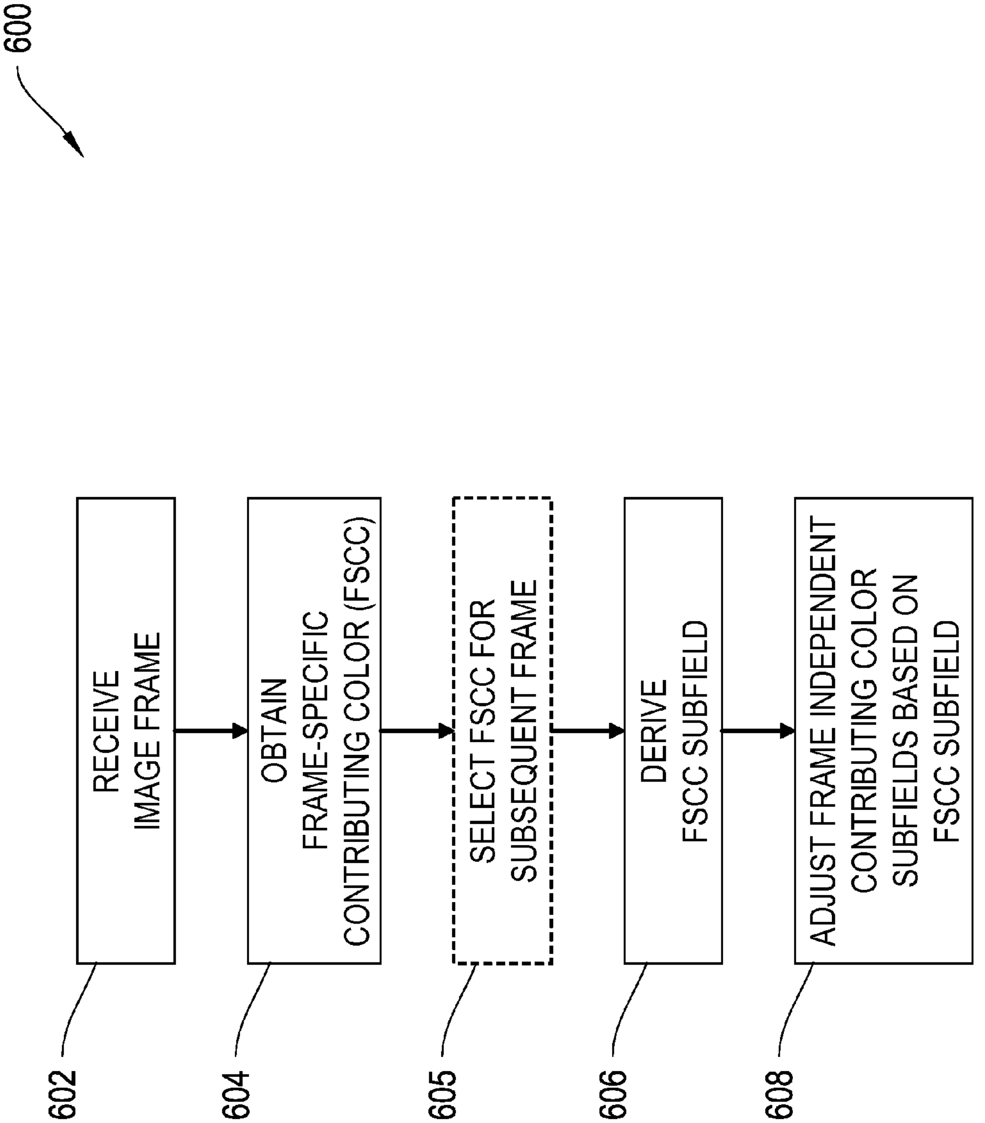
FIG. 6 shows a flow diagram of an example process of deriving color subfields.

FIG. 6 shows a flow diagram of an example process 600 of deriving color subfields. The process 600 may be used to perform stage 406 of the process of forming an image 400 shown in FIG. 4. The process 600 includes receiving an image frame (stage 602), obtaining a FSCC to use in forming the image (stage 604), deriving a color subfield for the FSCC for the image frame (stage 606), and then adjusting the color subfields of the FICCs based on the FSCC subfield pixel values (stage 608). Each of these stages, as well as the components of the subfield derivation logic 500 are described further below.

Referring to FIGS. 5 and 6, as set forth above, the process of deriving color subfields 600 begins with receiving an image frame (stage 602). The image frame may be received, for example, from the input 302 of the controller 300 shown in FIG. 3. The received image frame is passed to the contributing color selection logic 502.

The contributing color selection logic 502 is configured to obtain a FSCC to use in forming the image (stage 604). In some implementations, the contributing color selection logic 502 is configured to obtain the FSCC to use in forming an image using the image data associated with that image frame. In some other implementations, the contributing color selection logic 502 obtains the FSCC for an image frame based on image data associated with one or more previous image frames. In such implementations, the contributing color selection logic 502 analyzes a current image frame and stores a FSCC to be used in a subsequent image frame (stage 605) in memory 506 and obtains the FSCC to use in the current frame (stage 604) by retrieving from memory 506 the FSCC selection that was stored based on the prior image frame.

To select a FSCC (either for a current image frame or a subsequent image frame), the contributing color selection logic 502 includes a frame analyzer 508 and selection logic 510. In general, the frame analyzer 508 analyzes an image frame to determine its overall color characteristics, and based on its output, the selection logic 510 selects a FSCC. Example processes by which the contributing color selection logic 502 can select a FSCC are described further below in relation to FIGS. 7-9.

Figure 7:
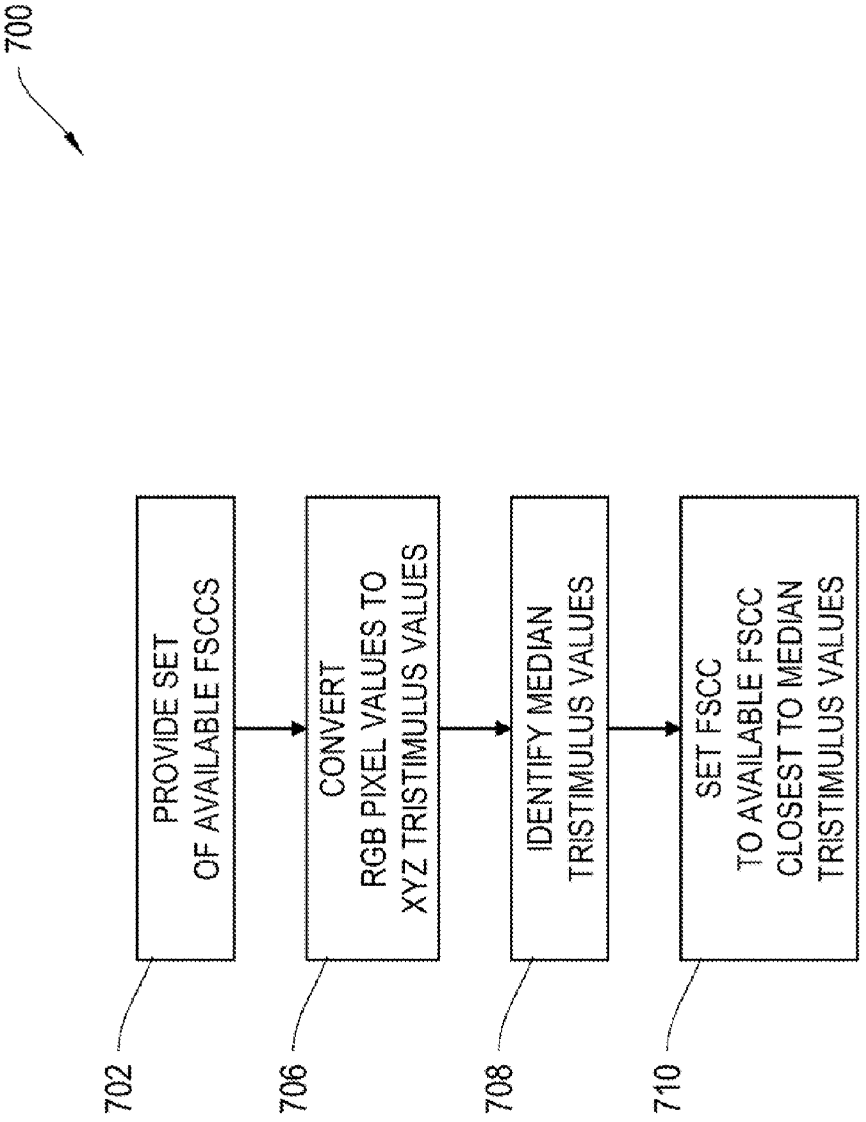
FIG. 7 shows a flow diagram of an example process of selecting a frame-specific contributing color (FSCC).

FIG. 7 shows a flow diagram of an example process 700 of selecting a FSCC. The FSCC selection process 700 is an example of a FSCC selection process suitable for execution by the contributing color selection logic 502. The process 700 includes providing the contributing color selection logic 502 with a set of available FSCCs to select from (stage 702), converting received image data into XYZ tristimulus values for processing (stage 706), identifying a color corresponding to the medians of the tristimulus values (stage 708), and setting the FSCC to the available FSCC closest to the color corresponding to the set median tristimulus values (stage 710).

Referring to FIGS. 5 and 7, the process 700 assumes that the contributing color selection logic 502 is configured to select only one of a predetermined set of available FSCCs to use in any given image frame. Selecting a FSCC from a predetermined set of composite colors can simplify both the FSCC selection stage (stage 708) as well as the FICC subfield adjustment stage (stage 608) shown in FIG. 6. Thus, the process 700 begins with providing the set of available FSCCs to the contributing color selection logic 502 (stage 702).

Most image data is received in the form of red, green, and blue pixel values. Thus, in some implementations, a display incorporating the subfield derivation logic 500 including the contributing color selection logic 502, uses red, green, blue, and in some cases, white LEDs to illuminate corresponding subfields associated with each image frame. The use of the red, green and blue is frame-independent, and such colors are referred to as FICCs. In some implementations, the provided FSCCs include colors formed from equal combinations of two or more of the FICCs. For example, the available FSCCs may include yellow (formed from the combination of red and green), cyan (formed from the combination of green and blue), magenta (formed from the combination of red and blue), and white (formed from the combination of red, green and blue). Such FSCCs can be generated by illuminating two or more of the display's LEDs, or, for example, in the case of white, by a separate LED designed to output the FSCC directly.

Selection of a FSCC can be more effective when evaluating a linear color space. The RGB color space is non-linear, but the XYZ color space is. Thus, the frame analyzer 508, processes the values of each pixel in a pixel frame to convert them into the XYZ color space (stage 706). The conversion is carried out through matrix multiplication of a matrix defined by the RGB intensity values for a pixel $$\begin{bmatrix} R \\ G \\ B \end{bmatrix}$$

with an XYZ transform matrix M, where:

$$M = \begin{bmatrix} X_r^{gamut} & X_g^{gamut} & X_b^{gamut} \\ Y_r^{gamut} & Y_g^{gamut} & Y_b^{gamut} \\ Z_r^{gamut} & Z_g^{gaumut} & Z_b^{gamut} \end{bmatrix} = \begin{bmatrix} \frac{x_r^{gamut}}{y_r^{gamut}} S_r & \frac{x_g^{gamut}}{y_g^{gamut}} S_g & \frac{x_b^{gamut}}{y_b^{gamut}} S_b \\ S_r & S_g & S_b \\ \frac{1 - x_r^{gamut} - y_r^{gamut}}{y_r^{gamut}} S_r & \frac{1 - x_g^{gamut} - y_g^{gamut}}{y_g^{gamut}} S_g & \frac{1 - x_b^{gamut} - y_b^{gamut}}{y_b^{gamut}} S_b \end{bmatrix}$$

and $X_r^{gamut}$, $Y_r^{gamut}$, and $Z_r^{gamut}$ correspond to the XYZ tristimulus values of the red primary of the color gamut being used, $X_g^{gamut}$, $Y_g^{gamut}$, and $Z_g^{gamut}$ correspond to the XYZ tristimulus values of the green primary of the color gamut being used, and $X_b^{gamut}$, $Y_b^{gamut}$, and $Z_b^{gamut}$ correspond to the XYZ tristimulus values of the blue primary of the color gamut being used. Similarly, $x_r^{gamut}$, $y_r^{gamut}$, $x_g^{gamut}$, $y_g^{gamut}$, $x_b^{gamut}$, $y_b^{gamut}$ correspond to the x and y coordinates of the red, green, and blue primaries, respectively, in the CIE color space. $S_r$, $S_g$, and $S_b$ correspond to the relative intensities of the red, green, and blue primaries in relation to the formation of the gamut's white point.

Once the pixel values for an image frame are converted to the XYZ color space, the frame analyzer 508 determines the median values of each of the X, Y and Z parameters of the image frame. In some implementations, the frame analyzer 508 calculates the median for each parameter across all pixel values of the image frame. In some other implementations, the frame analyzer 508 takes into account only those pixels that have luminances (i.e., values of Y) greater than a threshold luminance level, such as the mean Y value for the image frame. That is, in such implementations, the frame analyzer calculates:

$$\{X_{median}, Y_{median}, Z_{medium}\} = \{\text{median}(X), Y > Y_{mean}, \text{median}(Y), Y > Y_{mean}, \text{median}(Z), Y > Y_{mean}\}.$$

In some implementations, a histogram function is used to determine the median values. Using the median XYZ values for the image frame, the selection logic 510 selects as the FSCC, the available FSCC that is closest, in the XYZ color space, to the color corresponding to the median XYZ values (referred to as the median tristimulus color or MTC) calculated by the frame analyzer 508. In some other implementations, the selection logic 510 selects the FSCC by identifying the available FSCC color that is closest to the MTC in the CIE color space. After selecting the FSCC, the contributing color selection logic 502 converts the selected FSCC back to the RGB color space and outputs its RGB intensity values to the pixel transform logic 504.

In some other implementations, the selection logic 510 includes one or more distance thresholds associated with the available FSCCs, either individually or collectively. For example, in some implementations, if the MTC is not within a predetermined distance of any available FSCCs, the selection logic 510 decides to forgo selecting a FSCC. In some other implementations, the selection logic 510 maintains separate distance thresholds for each available FSCC. In such implementations, the selection logic 510 compares the distance between the MTC and the closest available FSCC. If the distance is greater than the threshold associated with that available FSCC, then the selection logic 510 decides to forgo selecting a FSCC. In some implementations, distance is calculated directly as the Euclidean distance in the XYZ color space. In some other implementations, the distance is calculated as the Euclidean distance of the colors based on their corresponding x and y coordinates in the CIE color space.

In some other implementations, the selection logic 510 favors colors that are perceived as brighter by the HVS when making the FSCC selection. For example, if the MTC for an image frame falls equidistant from two available FSCCs, such as yellow and cyan, the selection logic will select yellow as the FSCC. In some such implementations, the distances to each FSCC are weighted by the inverse of the relative perceived brightnesses of the respective FSCCs in comparison to the other FSCCs. For example, the distance between the MTC color and yellow is weighted by a factor of 0.5, whereas the distances to cyan and magenta are each weighted by a factor of 1.0. Doing so can help mitigate image artifacts, because generating brighter colors sequentially is more likely to cause image artifacts, such as CBU.

Figure 8A:
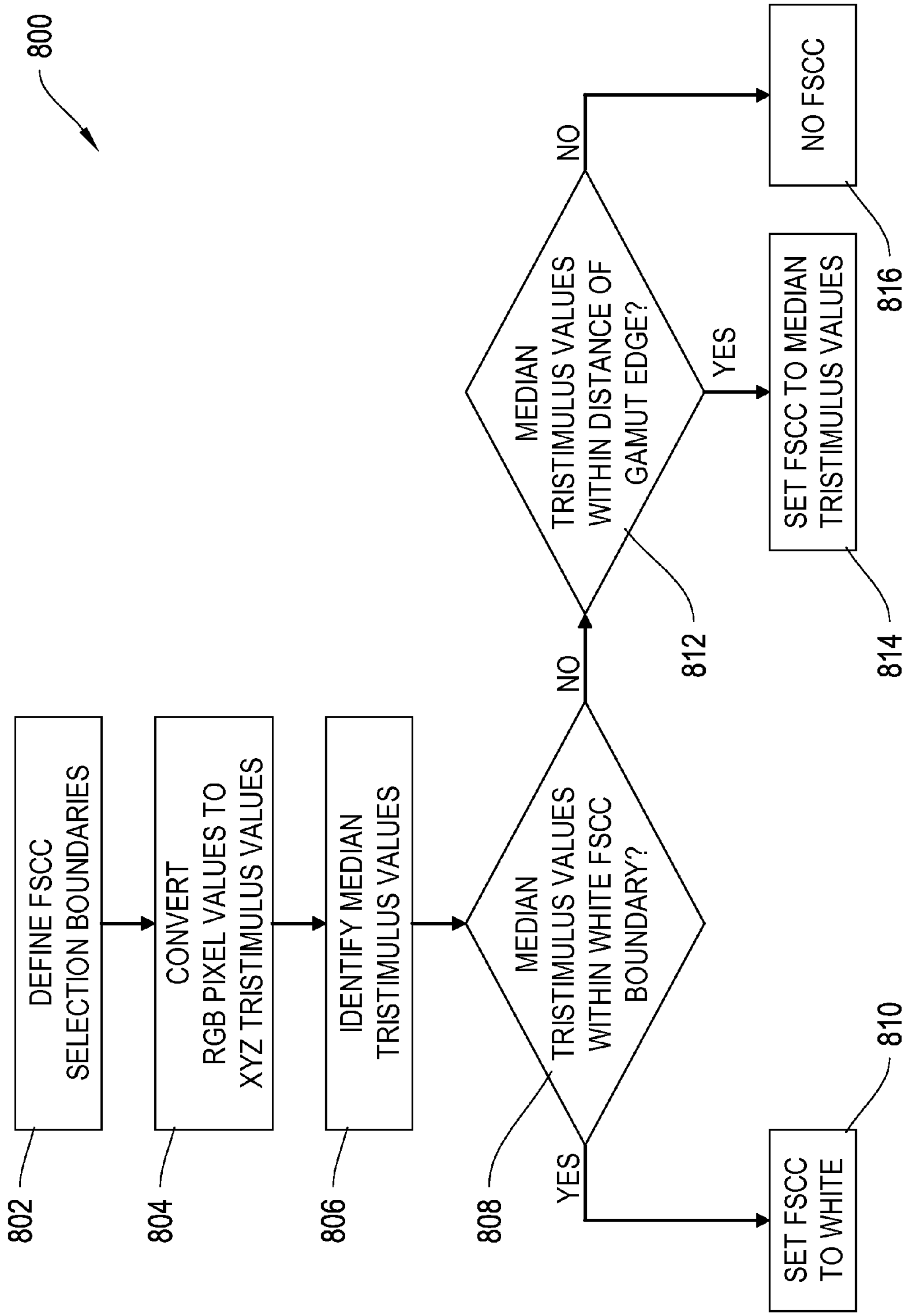
FIGS. 8A and 8B show flow diagrams of additional example processes for selecting a FSCC.
Figure 8B:
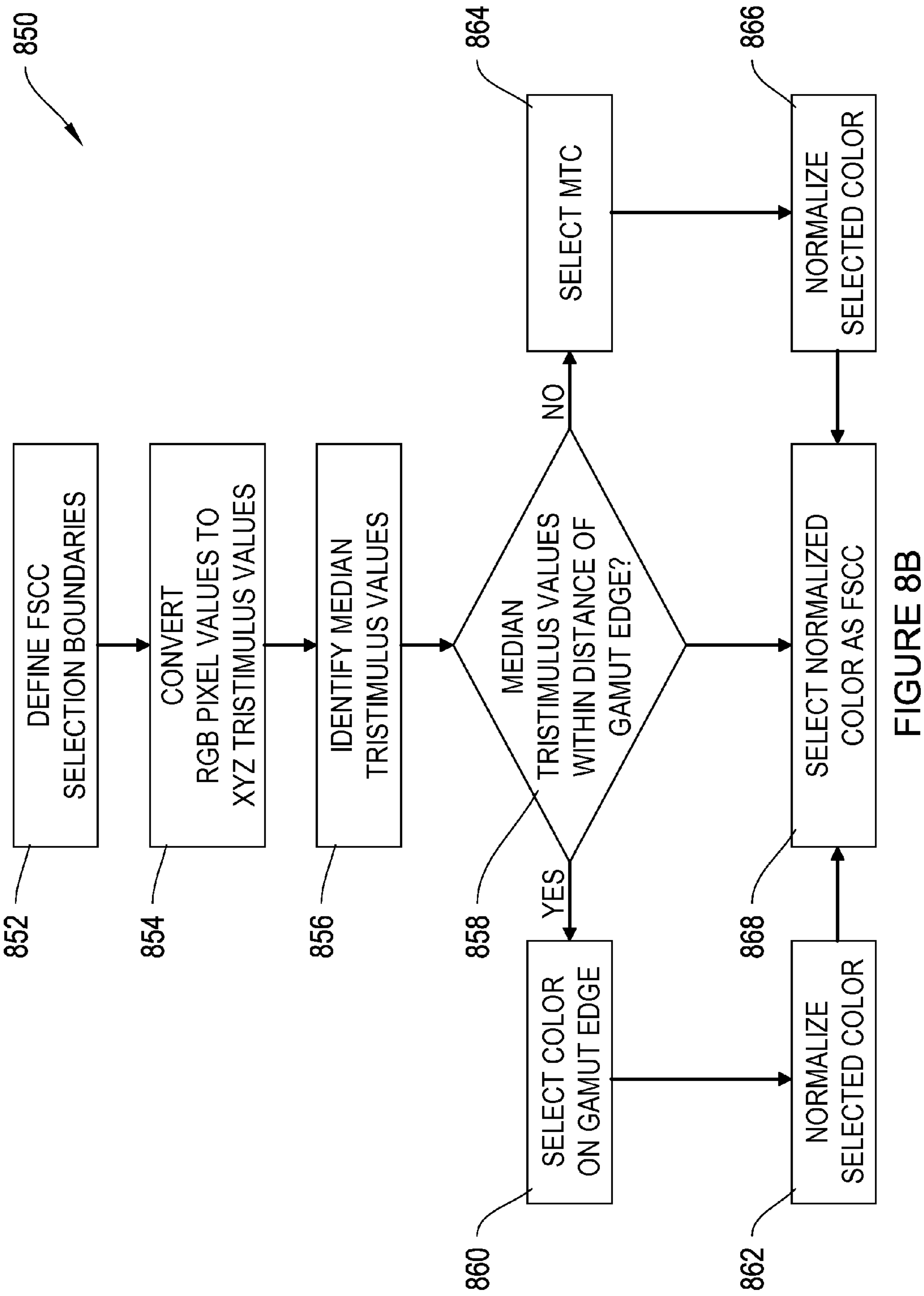

FIGS. 8A and 8B show flow diagrams of additional example processes 800 and 850 for selecting a FSCC. Like the FSCC selection process 700 shown in FIG. 7, the FSCC selection processes 800 and 850 are suitable for execution by the contributing color selection logic 502 shown in FIG. 5. However the FSCC selection processes 800 and 850 provide greater flexibility in selecting a FSCC. Instead of providing only a preselected set of available FSCCs to chose from (stage 702), as was done in the process 700 shown in FIG. 7, the FSCC selection process 800 allows the contributing color selection logic 502 to select between white and any color that is relatively near to the boundaries of the available color gamut of the display to use as the FSCC. The FSCC selection process 850 also allows for the selection of a broad range of colors as a FSCC.

More particularly, the FSCC selection process 800 includes defining FSCC selection boundaries (stage 802), converting received pixel values into XYZ tristimulus values (stage 804), identifying an MTC (stage 806), and determining whether the MTC is within a defined white FSCC boundary (stage 808). If the MTC is within the defined white FSCC boundary, the process sets the FSCC to white (stage 810). If MTC is outside of the white FSCC boundary, the process 800 continues with determining whether the MTC is within a predetermined distance of the edges of the color gamut (stage 812). If the MTC is within the predetermined distance, the process sets the FSCC to the MTC (stage 814). If not, the process refrains from setting a FSCC (stage 816).

Figure 9:
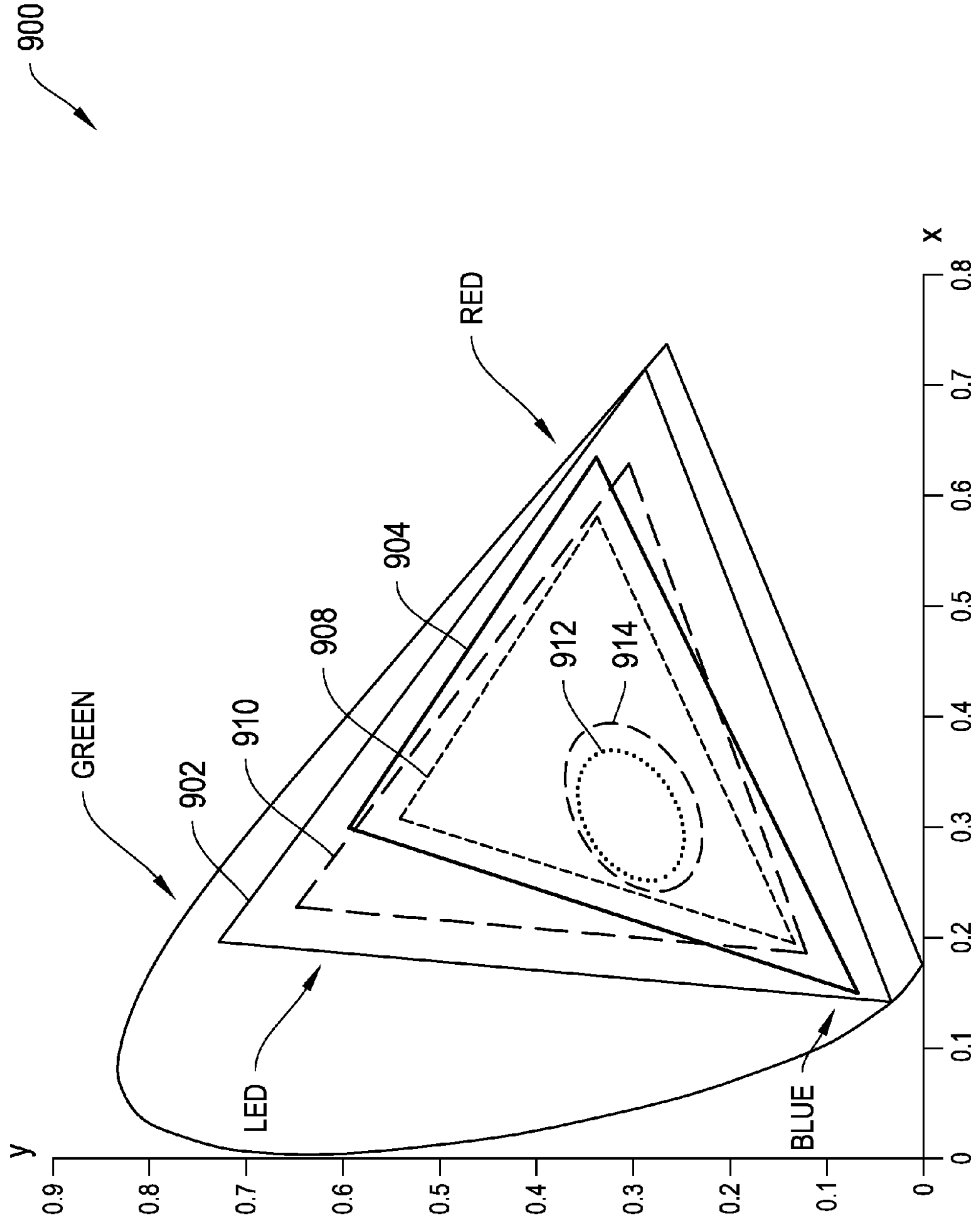
FIG. 9 shows two color gamuts depicting example FSCC selection criteria for use in the processes shown in FIGS. 8A and 8B.

Referring to FIGS. 5 and 8A, as set forth above, the FSCC selection process 800 begins with identifying which colors can be selected as a FSCC by defining boundaries within a color space that define the selectable colors (stage 802). FIG. 9 shows two color gamuts 902 and 904 depicting example FSCC selection criteria for use in the process of FIG. 8. Specifically, FIG. 9 shows both the Adobe RGB color gamut 902 and the sRGB color gamut 904. Each color gamut 902 or 904 is identified by a corresponding triangle depicted in solid lines within the CIE color space. The vertices of the respective triangles correspond to the highest saturation of a given primary color available in the color space.

Within each color gamut, FIG. 9 shows a second triangle shown in broken lines that defines the boundaries of a FSCC selection region. The triangle 908 in the shorter broken lines defines which non-white colors may be selected as the FSCC for an image frame, assuming operation within the sRGB color gamut. That is, when using the process 800 to select a FSCC while operating within in the sRGB color gamut, any color with x, y color coordinates within the region located between the triangle 908 and the outer boundary of the sRGB color gamut depicted by the triangle 904 can be selected as a FSCC. Similarly, the triangle 910, depicted in longer broken lines, defines the available non-white colors available for use as a FSCC assuming operation within the Adobe RGB color gamut.

FIG. 9 also shows two ovals, 912 and 914. The oval 912, depicted in the shorter broken lines, defines a white FSCC selection zone during operation within the sRGB color gamut. If the MTC falls within the oval 912, the FSCC selection process 800 defaults to using white as the FSCC. The oval 914 similarly defines a white FSCC selection zone during operation in the Adobe RGB color gamut.

The exact positions of the triangles 908 and 910 and the ovals 912 and 914 are merely illustrative in nature. Their exact position within their corresponding color gamuts may vary from display to display based on specific LEDs used in the display and the overall optical and power consumption profiles of the display. Similarly, the boundaries need not be defined by triangles. In some other implementations, the boundaries can be defined by other polygons, irregular shapes, as well as closed curves. In some implementations, the boundary of the color space usable by a FSCC is defined by a percentage, such as 5%, 10%, 20% or even up to 30%, of the total distance between any point on the edge of the color gamut and the color gamut white point. Similarly, the white FSCC selections zones 912 and 914 can take any closed shape deemed appropriate for the particular display.

After the FSCC boundaries are defined (stage 802), the contributing color selection logic 502 converts the RGB pixel values of the pixels in a received image frame into their corresponding XYZ tristimulus values (stage 804). The conversion can be carried out in the same fashion described above in relation to stage 706 of the FSCC selection process 700 shown in FIG. 7. The contributing color selection logic 502 then identifies the median tristimulus values for the image frame and the corresponding MTC (stage 806) as described above in relation to stage 708 of the FSCC selection process 700.

Continuing to refer to FIGS. 5 and 8, the selection logic 510 of the contributing color selection logic 502 determines whether the MTC falls within the previously defined white FSCC selection region boundaries (stage 808). If the MTC falls within the white FSCC selection region, the selection logic 510 selects white as the FSCC (stage 810). If the MTC falls outside of those boundaries, the selection logic 510 determines whether the MTC falls close enough to the edges of the color gamut to be within the non-white FSCC selection region (stage 812). If the MTC falls within that region, the selection logic 510 sets the FSCC to the color corresponding to the MTC (stage 814), converts the selected color back to the RGB color space and outputs its RGB intensity values to the pixel transform logic 504. Otherwise, the selection logic 510 refrains from selecting a FSCC (stage 816).

The FSCC selection process 850 shown in FIG. 8B is similar to the FSCC selection process 800. However, instead of allowing selection of non-white colors within a gamut boundary region, the FSCC selection process 850 allows selection of any color on the boundary itself, or outside of the boundary region, as a FSCC.

Referring to FIGS. 5 and 8B, the FSCC selection process 850 includes defining FSCC selection boundaries (stage 852), converting received pixel values into XYZ tristimulus values (stage 854), identifying an MTC (stage 856), and determining whether the MTC falls within a boundary region adjacent the edges of the display color gamut (stage 858). If the MTC falls within the boundary region, the process 850 selects a color on the edge of the color gamut (stage 860) near the MTC and normalizes the selected edge color (stage 862). The normalized color is selected to serve as the FSCC (stage 868). If the MTC falls outside of the boundary region, the process 850 selects the MTC (stage 864), normalizes the MTC (stage 866) and selects the normalized MTC as the FSCC (stage 868).

More particularly, the FSCC selection process 850 begins in much the same way as the FSCC selection process 800. The contributing color selection logic 502 defines the FSCC selection boundaries in a fashion similar to the way it did with respect to stage 802 of the FSCC selection process 800 (stage 852). In contrast, though, in defining the FSCC selection boundaries (stage 852) in the FSCC selection process 850, the contributing color selection logic 502 only defines an outer boundary region near the edges of the color gamut and does not define a separate white-FSCC selection region. Moreover, the region around the edges of the gamut, instead of defining a region of colors that can be included in a set of potential FSCCs, as in the FSCC selection process 800, the defined region defines a set of colors that are excluded from selection, as described further below.

The contributing color selection logic 502 then proceeds to convert the pixel values of an image frame into the corresponding XYZ tristimulus values (stage 854) and selects a MTC (stage 856) in the same fashion it did in stage 804 and 806 of the FSCC selection process 800.

The selection logic 510 of the contributing color selection logic 502 then determines whether the MTC falls within the boundary region defined in stage 852 (stage 858). If the MTC falls within the boundary, the selection logic selects a color on the edge of the color gamut to replace the MTC (stage 860). The selection logic can identify the color on the edge of the gamut in a variety of ways. In some implementations, the selection logic 510 identifies the color in the CIE color space on the edge of the color gamut having the smallest Euclidean distance to the MTC. In some other implementations, the selection logic 510 converts the MTC to the RGB color space and reduces the RGB component of the MTC with the smallest magnitude to 0. This effectively results in a color on the edge of the color gamut in the CIE color space.

After selecting a color on the edge of the CIE color space, the selection logic normalizes the RGB representation of the color such that the largest RGB component of the selected color is increased to 255 (stage 862) and uses the normalized color as the FSCC (stage 868). For example, the color Red 127, Green 60, and Blue 0 would be normalized to Red 255, Green 120, and Blue 0. More generally, the FSCC would be equal to:

$$FSCC = \left\{R * \frac{255}{\text{Max}(R, G, B)}, G * \frac{255}{\text{Max}(R, G, B)}, B * \frac{255}{\text{Max}(R, G, B)}\right\}.$$

If the selection logic 510 determines that the MTC is outside of the boundary region adjacent to the edges of the color gamut (at stage 858), the selection logic 510 selects the MTC (stage 864), normalizes the MTC (stage 866) as described above, and uses the normalized MTC as the FSCC (stage 868).

Various aspects of the above described processes can vary in different implementations. For example, in some implementations, if the MTC falls near the gamut white point—for example, within a white FSCC selection region or is closer to the white point than to any boundary of the color gamut—before selecting pure white or a near white as the FSCC, the selection logic 510 determines if there are particular concentrations of any colors in the image frame that are particularly prone to causing image artifacts if presented with a white or near white FSCC. Yellow and magenta are two such colors.

Yellow and magenta pixels can be identified heuristically by evaluating the histogram data generated for an image frame during preprocessing. Yellow can be detected, in some implementations, by identifying a non-negligible percentage (such as greater than about 1-3%) of pixels in an image frame having a 0 blue intensity, coupled with the image frame including at least a modest mean blue value, such as a mean value greater than about 20% or about 30% of the maximum blue value. Magenta can similarly be detected by identifying a non-negligible percentage of the pixels in the image frame having a 0 green intensity, coupled with the image frame having at least a modest mean green intensity (such as greater than about 30% or 40% of the maximum green value). If the selection logic 510 determines that there are likely a sufficient number of yellow or magenta pixels, the selection logic 510 selects a FSCC that lacks a blue or green component, respectively. For example, the selection logic can convert the MTC into the RGB color space and reduce the blue or green component of the MTC to 0. In some other implementations, upon detecting sufficient yellow content, the selection logic 510 chooses white as the FSCC, but uses a fractional replacement strategy (described further below) when generating an FSCC subfield to reduce the intensity of the white FSCC, for example by one half, one quarter, one eighth, or any other factor greater than 0 and less than 1.

In some implementations of the FSCC selection process 800 shown in FIG. 8, if the MTC falls within the non-white FSCC selection region, the selection logic 510 selects a color that omits any contribution from the contributing color furthest from the MTC. For example, were the selection logic 510 to identify a MTC within the non-white FSCC selection region near the boundary of the color gamut between the red and blue vertices, the selection logic would select the color on the boundary between red and blue vertices closest to the MTC as the FSCC. Doing so effectively removes any green component from the selected FSCC. Similarly, if the MTC falls within the non-white FSCC selection region between the red and green vertices, the selection logic 510 would select as the FSCC a color on the boundary of the gamut between those vertices, effectively eliminating any blue content in the FSCC. Alternatively, the selection logic 510 could obtain a similar result by converting the MTC to the RGB color space and reducing the smallest RGB component value to 0.

In some other implementations, the selection logic 510 will always select the MTC as a FSCC, regardless of where it falls in the color gamut.

Referring back to FIGS. 5 and 6, in implementations in which the subfield derivation logic 500 determines a FSCC to use for a subsequent image frame based on a current image frame, the subfield derivation logic 500 retrieves a previously stored FSCC from memory and stores the newly selected FSCC back to memory 506 (stage 605). In implementations in which subfield derivation logic 500 uses a FSCC for a current image frame based on the data included in the current image frame, the subfield derivation logic 500 proceeds directly with the subsequent stage of the subfield derivation process 600 using the FSCC selected by the contributing color selection logic 502.

Still referring to FIGS. 5 and 6, assuming the contributing color selection logic 502 obtained a FSCC to use for the image frame (either from memory or based on the current image frame), the subfield derivation logic 500 proceeds with deriving a FSCC subfield (stage 606). In one implementation, the pixel transform logic 504 of the subfield derivation logic 500 creates the FSCC subfield by, for each pixel in the image frame, identifying an intensity value that corresponds to the maximum light intensity that could be output for that pixel using the FSCC without altering the chromaticity of the pixel. Those values are stored as the FSCC subfield.

Such a FSCC subfield derivation strategy is referred to a "maximum replacement strategy," and the values resulting from such a strategy are referred to as "maximum replacement intensity values." In some other implementations, the subfield derivation logic 500 employs a different strategy in which, for each pixel, only a fraction of the maximum replaceable intensity values are allocated to the FSCC subfield. For example, the subfield derivation logic, in some implementations, assigns an intensity to each pixel in the FSCC subfield equal to between about 0.5 and about 0.9 times the maximum replacement intensity value for that pixel, though other fractions less than about 0.5 and between about 0.9 and 1.0 also can be employed. This strategy is referred to as a fractional replacement strategy.

After the FSCC subfield is derived (stage 606), the pixel transform logic 504 of the subfield derivation logic 500 adjusts a set of FICC subfields based on the FSCC subfield (stage 608). Depending on the FSCC selected, two or more of the FICC subfields may need to be adjusted. More particularly, the pixel transform logic 504 adjusts the pixel intensities of the FICC subfields associated with the FICCs that combine to form the FSCC. For example, assume the FICCs include red, green and blue. If Cyan was selected as the FSCC, the pixel transform logic 504 would adjust the pixel intensity values for the blue and green subfields. If yellow was selected as the FSCC, the pixel transform logic 504 would adjust the pixel intensity values of the red and green subfields. If white, or any other color spaced away from the edge of the color gamut, was selected as the FSCC, the pixel transform logic 504 would adjust the pixel intensity values of all three FICC subfields.

The initial FICC subfields are derived from the image data for the image frame received from the controller input 302 shown in FIG. 3, after any preprocessing that may have been necessary (see stage 404 shown in FIG. 4) has been completed. To adjust the FICC subfields, the pixel transform logic 504 starts with the initial FICC subfields and subtracts from the intensity values for each pixel in the corresponding FICC subfields the intensity of that FICC used to generate the respective pixel intensity for the pixel in the FSCC subfield.

Consider the following example for a single pixel, where the contributing color selection logic 502 has selected yellow as the FSCC. Assume the intensity values for the pixel in the FICC subfields are Red 200, Green 100 and Blue 20. Yellow is formed from equal parts of red and green. Thus, if a maximum replacement strategy were utilized (as described above), the pixel transform logic 504 would assign a value of 100, the highest value that can be equally subtracted from the red and green subfields, to the yellow subfield for the pixel. It would then reduce the values in the red and green subfields for that pixel accordingly to Red 100 and Green 0.

Consider another example in which the FSCC is orange, a color having unequal contributing color intensities. An example orange color has RGB intensity values of Red 250, Green, 125 and Blue 0. In this example, the intensity of red in the FSCC is twice that of green. Thus, when adjusting the pixels intensity values in the red and green subfields, the pixel transform logic 504 adjusts the intensity according to the same proportional relationship. Using the same example pixel, i.e., a pixel having FICC subfield values of Red 200, Green 100 and Blue 20, the pixel transform logic 504 could reduce the intensity values of both the red and green subfields for the pixel down to 0. The resulting subfield intensity values for the pixel would be Red 0, Green 0, Blue 20 and Orange 200.

Represented mathematically, for a pixel having initial FICC intensity values of R, G, and B, the pixel transform logic 504 sets the updated intensity values, R', G', and B' in the respective FICC subfields as follows:

$$\begin{bmatrix} R' \\ G' \\ B' \end{bmatrix} = \begin{bmatrix} R \\ G \\ B \end{bmatrix} - x \begin{bmatrix} x_R \\ x_G \\ x_B \end{bmatrix},$$

where x is the intensity value of the FSCC for the pixel, and $x_R$, $x_G$, and $x_B$ correspond to the relative intensities of each of the FICCs, red, green, and blue, in the FSCC, where each of R, G, B, x, $x_R$, $x_G$, and $x_B$ are represented by values ranging from 0 to 1. The updated R', G', and B' values can then be converted back to corresponding gray scale values for display purposes by multiplying them by the total number of gray scale levels being used by the display (for example, 255, for a display using an 8 bits-per-color grayscale process), and rounding to the nearest integer value.

As indicated above, in some other implementations, the pixel transform logic 504 may employ a strategy that does not maximize the replacement of FICCs with the FSCC. For example, the pixel transform logic may replace only 50% of the maximum replacement value for a pixel. In such an implementation, the same example pixel may be displayed using the following intensity values: Yellow 50, Red 150, Green 50 and Blue 20.

In some other implementations, a reduced-subframe replacement strategy is used to allocate pixel intensity values to the FSCC subfield. In such implementations, the controller in which the subfield derivation logic 500 is incorporated is configured to generate fewer subframes for the FSCC than for the FICCs. That is, the controller displays FICCs using a full complement of bitplanes having relative weights beginning at 1 and ranging up to 64 or 128. However, for the FSCC subfield, the controller only generates and causes to be displayed a limited number of higher weighted subframes. The FSCC subframes are generated with higher weights to maximize the luminance replacement provided by the FSCC, without employing a larger number of additional subframes.

For example, in some implementations, the controller is configured to generate between 6-10 subframes for each of the FICC subfields and only 2 or 3 higher-weight subframes for the FSCC subfield. In some implementations, the weights of the FSCC subframes are selected from the highest significance weights of a binary sub-frame weighting scheme. For an 8-bit-per-color gray scale process, the controller would generate three FSCC subframes having weights of 32, 64 and 128. The weights of the subframes for the FICCs may or may not be assigned according to a binary weighting scheme. For example, the subframe weights for the FICCs may be selected to include some degree of redundancy to allow multiple representations of at least some gray scale values. Such redundancy aids in reducing certain image artifacts, such as dynamic false contouring ("DFC"). Thus, the controller may utilize 9 or 10 subframes to display an 8-bit FICC value.

In implementations in which fewer FSCC subframes are used, the pixel transform logic 504 cannot assign intensity levels to the FSCC subfield with as a high granularity as it does in implementations in which it employs a full complement of FSCC subframes. Thus, when determining the FSCC intensity levels for the pixels in a FSCC subfield, the pixel transform logic 504 assigns each pixel a value equal to the maximum FSCC intensity that could used to replace FICC light intensity, and then rounds the value down to the closest intensity level that can be generated given the reduced number of subframes and their corresponding weights.

Consider a pixel having FICC intensity values of Red 125, Green 80, and Blue 20 being processed by a controller that uses FSCC subframe weights of 128, 64, and 32. In this example, assume the contributing color selection logic 502 selects Yellow as the FSCC. The subfield derivation logic 206 would identify a maximum replacement value for Red and Green as 80. It would then assign an intensity value of 64 for the pixel in the yellow subfield, as 64 is the maximum intensity of yellow that can be displayed using the above-referenced weighting scheme without providing a greater intensity of yellow than exists in the pixel.

Consider another example in which a pixel has FICC values of Red 240, Green 100, and Blue 200. In this case, assume white is selected as the FSCC. Given the FSCC subframe weights of 32, 64 and 128, the pixel transform logic 504 selects a FSCC intensity value of 96, the highest common intensity level shared by each of the FICCs that can be generated using the available FSCC subframe weights. Thus, the pixel transform logic 504 sets the FSCC and FICC color subfield values for the pixel to be Red 154, Green 4, Blue 154 and White 96.

While using a reduced number of subframes for a FSCC reduces the load on the display to generate extra subframes, it does pose the risk of causing DFC when displaying neighboring pixels having a similar overall colors, but which are displayed using different FSCC values. For example, DFC might arise when displaying neighboring pixels having respective maximum replacement intensity values of 95 and 96 such as for colors Red 95, Green 95, and Blue 0 and Red 96, Green 96, and Blue 0. Assuming the FSCC is yellow, the first pixel would be displayed using a FSCC intensity of 64 and red blue and green intensities of Red 31, Green 31, and blue 0, respectively. The second pixel would be displayed with a FSCC intensity of 96 and red, green, and blue intensities of Red 0, Green 0, Blue 0. This significant difference in the FSCC color channel coupled with the significant differences in the red and green channels can be detected by the HVS, resulting in a DFC artifact.

The FSCC and FICC derivation processes described above aim to faithfully reproduce an image encoded in the image data in a received image. In some implementations, the subfield derivation logic of a controller is configured to generate subfields which, when displayed, intentionally result in a displayed image that differs from the input image data. For example, in some implementations, subfield derivation logic can be configured to generate image frames that generally have a higher luminance than indicated in a received image frame.

In one such implementation, after a FSCC subfield is generated using the reduced-subframe replacement strategy described above, a scaling factor is derived and applied when adjusting each of the pixel values in the FICC subfields based on the FSCC subfield. The scaling factor for a pixel is calculated as a function of a saturation parameter, a minimum pixel luminance value, $Y_{min}$, and a maximum pixel luminance value, $Y_{max}$. The saturation parameter is derived from the degree of subframe reduction used in generating the FSCC subfield. For a display using 8 bits-per-color for its FICCs, the saturation parameter can be calculated as follows:

$$\text{saturation\_scale} = \frac{1}{255}\sum_{8-nx+1}^{7} 2^x,$$

Where nx is the number of bits used to display the FSCC. $Y_{min}$ and $Y_{max}$ are functions of the selected FSCC and the each pixel's FICC intensity values in the initial FICC subfields. They are calculated as follows:

$$Y_{min} = \min(RBG_{scaled} \times \min\{R, G, B\}),$$

$$Y_{max} = \max(RBG_{scaled} \times \max\{R, G, B\}), \text{ and}$$

$$RBG_{scaled} = \left\{\frac{R}{x_R}, \frac{G}{x_G}, \frac{B}{x_B}\right\},$$

$$\text{where } (x_R, x_G, x_B \neq 0).$$

In the above, $x_R$, $x_G$, and $x_B$ represent relative intensities of red, green, and blue in the FSCC (expressed as a value between 0 and 1, where 0 corresponds to no intensity and 1 corresponds to a maximum possible intensity). R, G, and B correspond to the red, green, and blue intensity values (expressed as values between 0 and 1) for a given pixel in a received image frame. Thus $Y_{min}$ is the minimum value of the set:

$$\left[\frac{R}{x_R} \times \min(R, G, B), \frac{G}{x_G} \times \min(R, G, B), \frac{B}{x_B} \times \min(R, G, B)\right],$$

and $Y_{max}$ is the maximum value of the set:

$$\left[\frac{R}{x_R} \times \max(R, G, B), \frac{G}{x_G} \times \max(R, G, B), \frac{B}{x_B} \times \max(R, G, B)\right],$$

The scaling factor, M, is then calculated as:

$$M = \text{saturation\_scale} \times \frac{Y_{min}}{Y_{max}}.$$

The new pixel intensity values, R', G', and B' for a pixel are then calculated by scaling the original FICC pixel values, R, G, and B, using the scaling factor, M, and subtracting out the intensity of each FICC in the FSCC channel subfield. These intensity values are in turn equal to the product of the FSCC intensity value for the pixel, x, and the relative intensity values of each FICC in the FSCC, i.e., $x_R$, $x_G$, and $x_B$. That is:

$$\begin{bmatrix} R' \\ G' \\ B' \end{bmatrix} = \begin{bmatrix} 1+M & 0 & 0 \\ 0 & 1+M & 0 \\ 0 & 0 & 1+M \end{bmatrix} \begin{bmatrix} R \\ G \\ B \end{bmatrix} - x \begin{bmatrix} x_R \\ x_G \\ x_B \end{bmatrix}$$

In some implementations, to help mitigate the DFC potentially arising from using only higher weighted subframes for the FSCC subframes, the pixel transform logic 504 modifies the FSCC subfield by applying a spatial dithering algorithm to the FSCC subfield prior to updating the FICC subfields. The spatial dithering distributes any quantization error associated with using the reduced number of higher-weighted subframes. Various spatial dithering algorithms, including an error diffusion algorithm (or variants thereof) can be used to effect the dithering. In some other implementations, block quantization and ordered dithering algorithms may be employed, instead. The intensity values of the pixels in the FICC subfields are then calculated accordingly based on the dithered FSCC subfield.

In each of the implementations set forth above, a FSCC was selected based on computing the median tristimulus values of the pixels in an image frame. The distances to the MTC corresponding to the set of median tristimulus values referred to above serve as a proxy for the prevalence of each FSCC in the image frame. In other implementations, other proxies may be used. For example, the FSCC in some implementations can be based on the mean or the mode of the pixel tristimulus values. In some other implementations, the FSCC may be based on the median, mean, or mode RGB pixel intensity values for the image frame.

Some implementations of a subfield derivation logic similar to the subfield derivation logic 500 shown in FIG. 5 also incorporate CABC logic. In such implementations, after the FSCC subfields and FICC subfields are derived, the CABC logic normalizes the intensity values in one or more of the subfields such that the maximum intensity value in each normalized subfield is scaled to the maximum intensity value output by the display. For example, in a display capable of outputting 256 gray scale levels, the subfield values are scaled such that the maximum intensity value therein is equal to 255. The subfield derivation logic then outputs corresponding normalization factors to the output control logic of the apparatus in which it is incorporated such that the illumination levels of the corresponding LEDs are adjusted accordingly. An example of subfield derivation logic that incorporates CABC logic is shown in FIG. 10.

Figure 10:
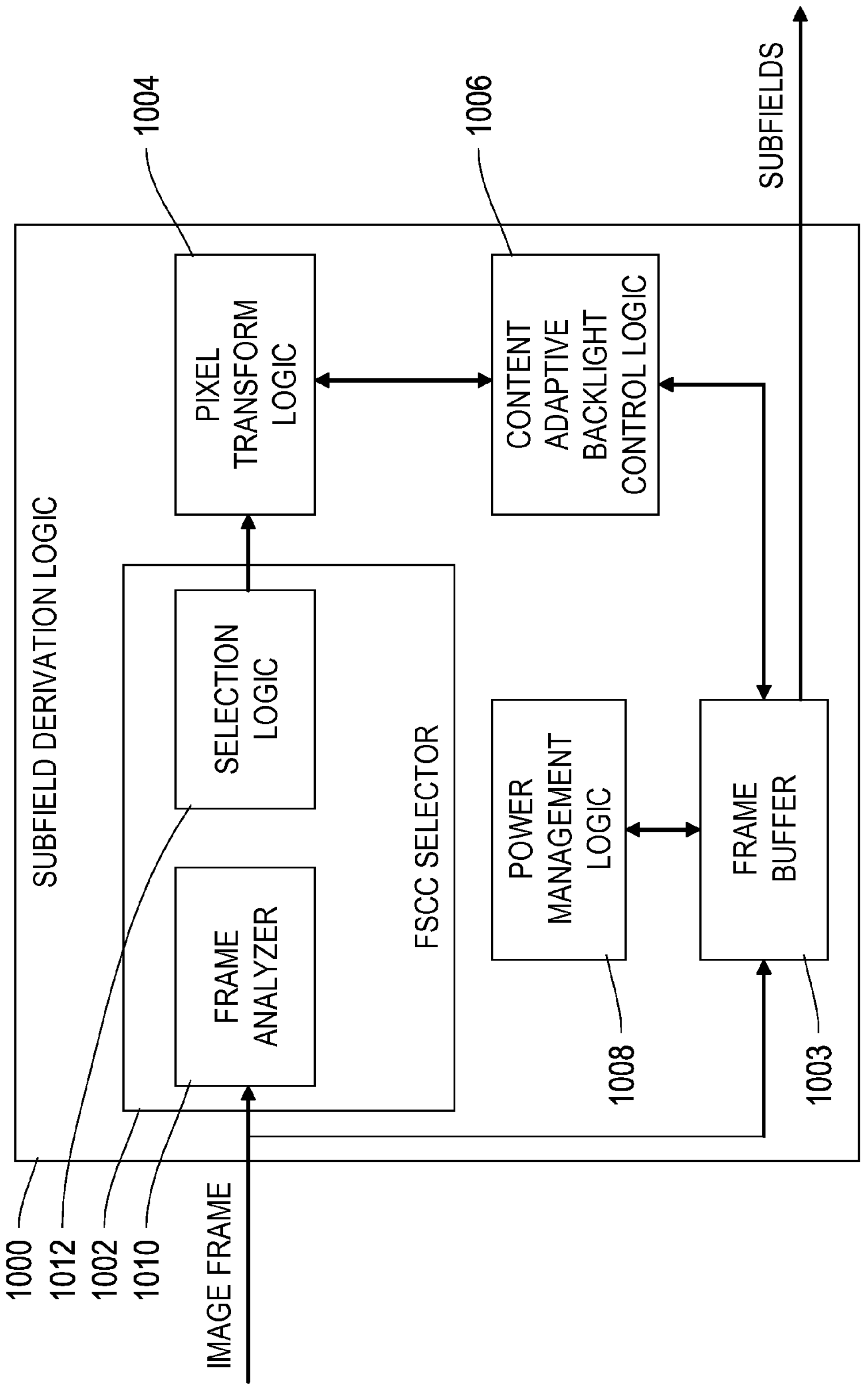
FIG. 10 shows a block diagram of a second subfield derivation logic.

FIG. 10 shows a block diagram of a second subfield derivation logic 1000. The subfield derivation logic 1000 includes a contributing color selection logic 1002, a subfield store 1003, pixel transform logic 1004, CABC logic 1006 and power management logic 1008. Together, the components of a subfield derivation logic 1000 function to carry out a process of forming an image, such as the process shown in FIG. 11. The functionality of each of the components will be described below in relation to the description of FIG. 11.

Figure 11:
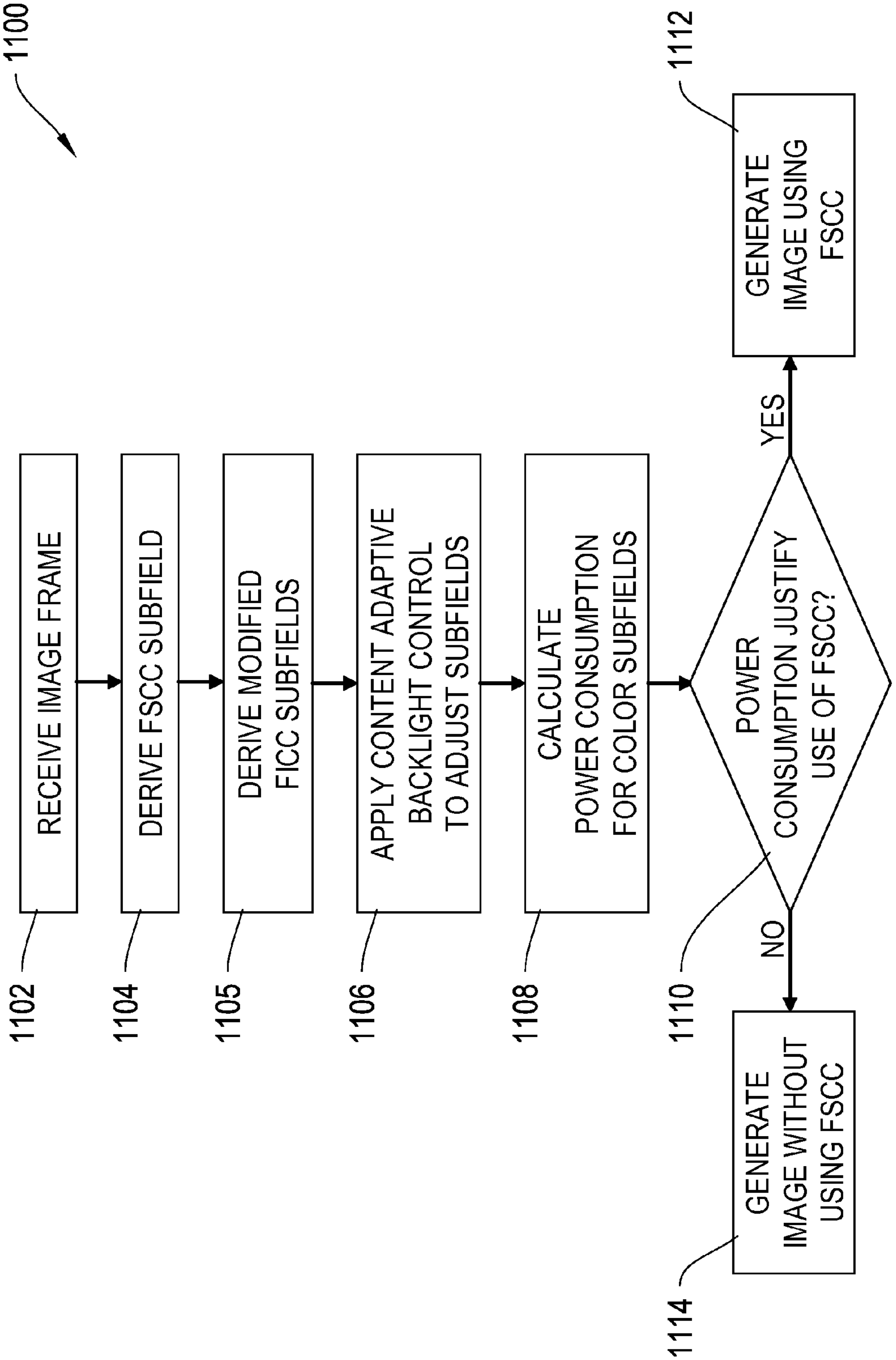
FIG. 11 shows a flow diagram of another example process of forming an image.

FIG. 11 shows a flow diagram of another example process 1100 of forming an image. The image formation process 1100 utilizes CABC functionality along with additional power management functionality. The power management functionality determines for each frame whether to form an image using a FSCC, or whether to only use FICCs, depending on the relative power consumption associated with each option. The process 1100 includes receiving an image frame (stage 1102), deriving a FSCC subfield based on the received image frame (stage 1104), deriving modified FICC subfields based on the FSCC subfield (stage 1105), applying CABC (stage 1106), calculating the power consumption associated with presenting the image using only FICCs and using a combination of FICCs and FSCCs (stage 1108). The process further includes determining whether using the FSCC to generate the image is justified based on the relative power consumption of the two options (stage 1110). If use of the FSCC is justified, the process proceeds with forming the image using the FSCC (stage 1112). Otherwise, the process continues to form the image using only FICCs (stage 1114).

Referring to FIGS. 10 and 11, the process 1100 begins with the receipt of an image frame (stage 1102). The subfield derivation logic 1000 receives the image frame from the input of the apparatus in which the subfield derivation logic 1000 is incorporated. In some implementations, the received image frame is preprocessed prior to its receipt at the subfield derivation logic 1000. In other implementations, the subfield derivation logic includes an additional preprocessing logic block to preprocess the image frame. For example, the preprocessing logic may apply a scaling or gamma correction algorithm to the received image frame to adapt it to the particular specifications of the display in which it is incorporated. The image frame is then passed to the contributing color selection logic 1002 and to the subfield store 1003. The subfield store 1003 stores the image frame as a set of FICC color subfields formed form the input data. In some implementations, the subfield store 1003 is part of a frame buffer shared among other components of the apparatus in which the subfield derivation logic 1000 is incorporated, such as the frame buffer 307 of the apparatus 300 shown in FIG. 3. In some other implementations, the subfield store 1003 is a separate memory device or a separate partition of a shared memory device.

The contributing color selection logic 1002 carries out substantially the same functionality as the contributing color selection logic 502 shown in FIG. 5. The contributing color selection logic 1002 includes a frame analyzer 1010 and selection logic 1012 which together analyze a received image frame and select a FSCC to use for presenting the image, respectively. The contributing color selection logic 1002 may implement any of the current image frame or subsequent image frame FSCC selection techniques described above.

After a FSCC is selected, the pixel transform logic 1004 processes the image frame using the selected FSCC to derive a FSCC subfield (stage 1104). The pixel transform logic 1004 may derive the FSCC subfields using any of the FSCC subfield generation techniques described above, including without limitation, using the maximum replacement strategy, a fractional replacement strategy, or a reduced-subframe replacement strategy (with or without dithering). The pixel transform logic 1004 then derives modified FICC subfields based on the FSCC subfield (stage 1105). The pixel transform logic 1004 derives new FICC subfields instead of modifying the original FICC subfields such that the power consumption associated with displaying the image frame with and without a FSCC can be compared, as described further below.

Once the new FICC subfields are derived (stage 1105), the CABC logic 1008 processes the FSCC subfield and the new FICC subfields, as well as the original FICC subfields as described above (stage 1106). The normalized subfields may then be saved into the subfield store 1003. In some implementations, the CABC logic 1008 process the original FICC subfields before processing the derived subfields. For example, the CABC logic 1008 can process the original FICC subfields while the other components of the subfield derivation logic 1000 are selecting a FSCC and deriving the FSCC subfield.

The power management logic 1010 is configured to determine whether to display the image using the selected FSCC or to just use the FICCs. Doing so includes two stages. First, the power management logic 1010 processes the CABC processed subfields to determine the power that would be consumed, hypothetically, if the image frame were presented with and without the FSCC subfield (stage 1108). Then, the power management logic 1010 compares the respective power consumptions and determines whether or not use of the FSCC is justified (stage 1110) based on the comparison.

In the simple case, the power management logic 1010 determines to use the FSCC to generate an image frame if doing so saves power. However, use of the FSCC, while in some cases potentially requiring additional power, also can help reduce certain image artifacts, such as color breakup (CBU). Thus in some implementations, the power management logic 1010 determines to use the FSCC even if doing so consumes some amount of power more than would be consumed using only FICCs. This determination can be generalized as follows:

$$DisplayMode = \begin{cases} RGBx, & \beta P_{RGBx} < P_{RGB} \\ RGB, & \text{Otherwise,} \end{cases}$$

where RGBx refers to displaying the image frame using the FSCC x, RGB refers to displaying the image frame using only FICCs, $\beta \leq 1$, $P_{RGB}$ is the power that would hypothetically be consumed if the image frame were displayed using only FICCs, and $P_{RGBx}$ is the power that would hypothetically be consumed if the image frame were displayed using FSCC x.

Power savings are more likely achieved when the selected FSCC is white and the display includes a white LED to generate the white light. This is a result of the substantially higher efficiency of white LEDs in comparison to LEDs that generate saturated colors. However, the use of FSCCs other than white may still provide power advantages due to the ability to shift some of the intensity associated with one or more FICCs into the FSCC subfield, and through the use of CABC, enable the display to illuminate those FICCs at a substantially lower intensity.

Theoretically, the power consumed in displaying an image (either $P_{RGBx}$ or $P_{RGB}$) can be broken down into two primary components, addressing power consumption ($P_a$) and illumination-related power consumption ($P_i$), with the latter typically dwarfing the former.

$P_i$ resulting from display of an image frame using only the FICCs red, green, and blue, i.e., $P_{iRGB}$, can be calculated as follows:

$$P_{iRGB}=P_{iR}+P_{iG}+P_{iB},$$

where $P_{iR}$ corresponds to the power consumed in illuminating a set of red subframes, $P_{IG}$ corresponds to the power consumed in illuminating a set of green subframes, and $P_{iB}$ corresponds to the power consumed in illuminating a set of blue subframes.

$P_i$ resulting from display of an image frame using only a FSCC, i.e., ($P_{iRGBx}$, where x represents the FSCC), can be calculated as follows:

$$P_{iRGBx}=P_{iR}+P_{iG}+P_{iB}+P_{ix},$$

The power consumed for a color is a function of the power curve of the LEDs used generate the color, the intensity of the LEDs, and the total duration of illumination of the color across the subframes used to illuminate the subfield. The intensity of the LEDs is a function of the gray scale process being employed, the normalization factor for the color determined during the CABC process, and for FSCCs or any other composite color, the relative intensities of each color used in forming the composite color. Using the above parameterization, the power management logic 1010 can computer the hypothetical (or theoretical) power consumption associated with displaying in an image both with and without the use of an FSCC.

If, based on the power computations described above, the power management logic 1010 deems use of the FSCC justified (at stage 1110), i.e., that $\beta P_{RGBx} < P_{RGB}$, the controller in which the subfield derivation logic 1000 is incorporated proceeds with forming the image using the FSCC (stage 1112). Otherwise, the controller proceeds with using just the CABC-corrected original FICC subfields.

Referring back to FIGS. 5 and 6, as set forth above, in some implementations, the subfield derivation logic 500 of a controller is configured to generate FSCC subfields using a FSCC that was selected based on the data in the previous image frame, referred to as a "delayed FSCC." Doing so can be advantageous as it allows color subfield derivation (stage 406) to be carried out in parallel with selection of the FSCC for the subsequent image frame (stages 605). Doing so also removes the need for a memory to store FICC subfields while the they are being processed to determine the FSCC. However, if the color composition of an image frame is substantially different than the color composition of a previous image frame, such as often occurs during scene changes, the use of a delayed FSCC can result in reduced image quality for the current image frame and a noticeable flicker when the FSCC changes for the frame thereafter.

The potential shortcomings of using a delayed FSCC can be mitigated, though, through use of a FSCC smoothing process. The smoothing process can be incorporated into the selection logics 510 and 1010 shown in FIGS. 5 and 10, respectively. In general, the color smoothing process limits the degree to which the FSCC is allowed to change from frame to frame.

Figure 12:
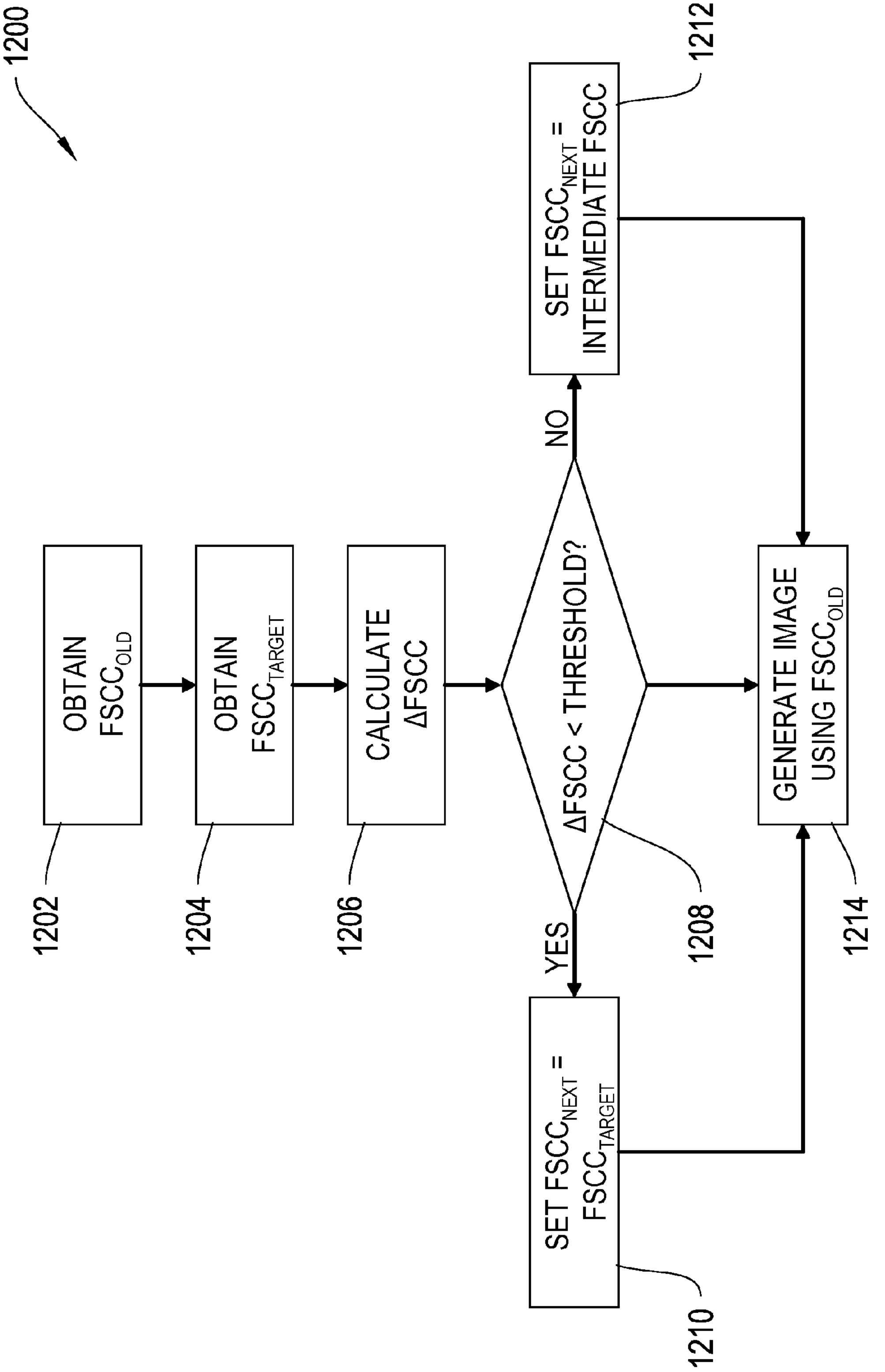
FIG. 12 shows a flow diagram of an example color FSCC smoothing process.

FIG. 12 shows a flow diagram of an example FSCC color smoothing process 1200. The FSCC color smoothing process 1200 may be executed by, for example, the selection logics 510 or 1010 shown in FIGS. 5 and 10, respectively. The process 1200 includes the selection logic obtaining a previous FSCC, $FSCC_{old}$ (stage 1202); obtaining a new, target FSCC, $FSCC_{target}$ (stage 1204); calculating a difference between the previous FSCC and the target FSCC, ΔFSCC (stage 1206); and comparing ΔFSCC to a color change threshold (stage 1208). If ΔFSCC falls below the color change threshold, the selection logic sets the next FSCC, $FSCC_{next}$, to $FSCC_{target}$ (stage 1210). Otherwise, the selection logic sets $FSCC_{next}$ to an intermediate FSCC between $FSCC_{old}$ and $FSCC_{target}$ (stage 1212). In either case, the current image frame is then generated using $FSCC_{old}$.

As set forth above, the color smoothing process 1200 begins with the selection logic obtaining the value of $FSCC_{old}$. For example, FSCC may be stored in memory in the controller executing the process 1200. Next, the selection logic obtains a value for $FSCC_{target}$ (stage 1204). $FSCC_{target}$ is the FSCC that would be used to generate the next image frame, absent any color smoothing implemented by the process 1200. The selection logic can select the $FSCC_{target}$ according to any of the FSCC selection processes described above.

Once the $FSCC_{old}$ and $FSCC_{target}$ are obtained, the selection logic computes ΔFSCC (stage 1206). In one implementation, ΔFSCC is calculated for each FICC component used to generate in the respective FSCCs. That is, the selection logic computes a $\Delta FSCC_{Red}$, a $\Delta FSCC_{Green}$, and a $\Delta FSCC_{Blue}$ equal to the difference in the red, blue, and green components, respectively of $FSCC_{old}$ and $FSCC_{target}$.

Each FICC component of $FSCC_{next}$ is then determined separately. If the intensity change in a color component falls below a corresponding color change threshold, that color component in $FSCC_{next}$ is set directly to the target intensity of that color component (stage 1208). If not, that color component in $FSCC_{next}$ is set to an intermediate value between the value of the component in $FSCC_{old}$ and $FSCC_{target}$ (stage 1210). It is computed as follows:

$$FSCC_{next}(i)=FSCC_{old}(i)+\Delta FSCC(i)*\text{percent\_shift}(i),$$

where i is a FICC color component and percent_shift(i) is an error parameter defining the degree with which the component color is allowed to shift from frame to frame. In some implementations, the percent_shift(i), is set separately for each component color. Its value, in some implementations, ranges from around 1% to around 5%, though in other implementations it may be as high as about 10% or higher for one or more component colors. The selection logic, in some implementations, also applies separate color change thresholds for each color component. In other implementations, the color change threshold is constant for all component colors. Suitable thresholds, assuming an 8-bit per color grayscale scheme in which component color intensities range from 0 to 255, range from around 3 to around 25.

In some implementations, the selection logic applies multiple color change thresholds and corresponding percent_shift(i) parameters for one or more component colors. For example, in one implementation, if ΔFSCC(i) exceeds an upper threshold, then a lower percent_shift(i) parameter is applied. If ΔFSCC(i) falls between the upper threshold and a lower threshold, a second higher percent_shift(i) parameter is applied. In some implementations, the lower percent_shift(i) parameter is less than or equal to about 10%, and the second, higher percent_shift(i) parameter is between about 10% and about 50%.

In some other implementations, ΔFSCC is calculated holistically for the FSCC in the CIE color space, using the x and y coordinates of $FSCC_{old}$ and $FSCC_{target}$. In such implementations, ΔFSCC is the Euclidean distance between the FSCCs on a CIE diagram. If the distance exceeds a color change threshold, the $FSCC_{next}$ is set to color corresponding to a point a fraction (percent shift CIE) of the way along a line connecting $FSCC_{old}$ and $FSCC_{target}$ in the CIE diagram. Similar distances can be computer using the FSCCs' tristimulus values.

After the selection logic determines $FSCC_{next}$, the current image frame is displayed using $FSCC_{old}$, and $FSCC_{next}$ is stored as the new $FSCC_{old}$ for use in the next image frame.

Referring back to FIG. 1B and FIG. 3, the display apparatus 128 includes only includes red, green, blue and white LEDs. However, as described above, several of the FSCC selection processes disclosed above enable a controller 134, such as the controller 300, to select a wide range of colors as the FSCC. Assuming the FSCC is not selected to be the exact white provided by the white LED, the display apparatus 128 illuminates two or more of the LEDs to generate the FSCC. The output control logic 308 of the controller 300 is configured to calculate the appropriate combinations of illumination intensities of the LEDs to form the FSCC. In theory, given that the display apparatus includes red, green, blue, and white LEDs, there are an infinite number of illumination intensity combinations that would generate the FSCC. However, to avoid image artifacts that could result from generating the same FSCC using different color combinations at different times, it is beneficial for the output logic 308 to be configured to select a set of LED illumination intensities using an algorithm that has only one possible solution.

Figure 13:
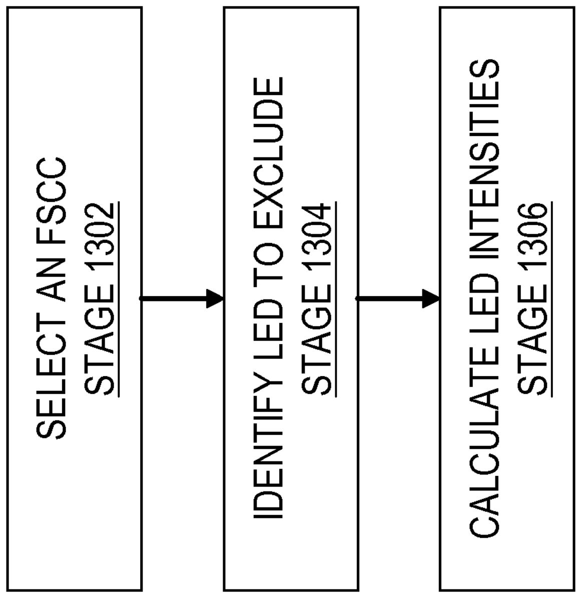
FIG. 13 shows a flow diagram of a process of calculating LED intensities for generating a FSCC.

FIG. 13 shows a flow diagram of a process 1300 of calculating LED intensities for generating a FSCC. The process 1300 includes selecting a FSCC (stage 1302); identifying a non-white LED to exclude from the generation of the FSCC (stage 1304); and calculating the LED intensities for the subset of LEDs based on the selected FSCC (stage 1306).

Referring to FIGS. 3 and 13, as set forth above, the process 1300 begins with the selection of a FSCC (stage 1302). The FSCC can be selected by the subfield generation logic 304 of the controller 300 using any of the FSCC selection processes described above.

Then, the output logic 308 of the controller 300 identifies a non-white LED to exclude from the generation of the FSCC (stage 1304). Given that the display apparatus includes a white LED, and that such LEDs are more efficient than color LEDs, it is beneficial to have as much luminance in an image provided by the white LED as possible to reduce power consumption of the display. In addition, any composite color can be formed from a combination of white and two of red, blue, and green.

Figure 14:
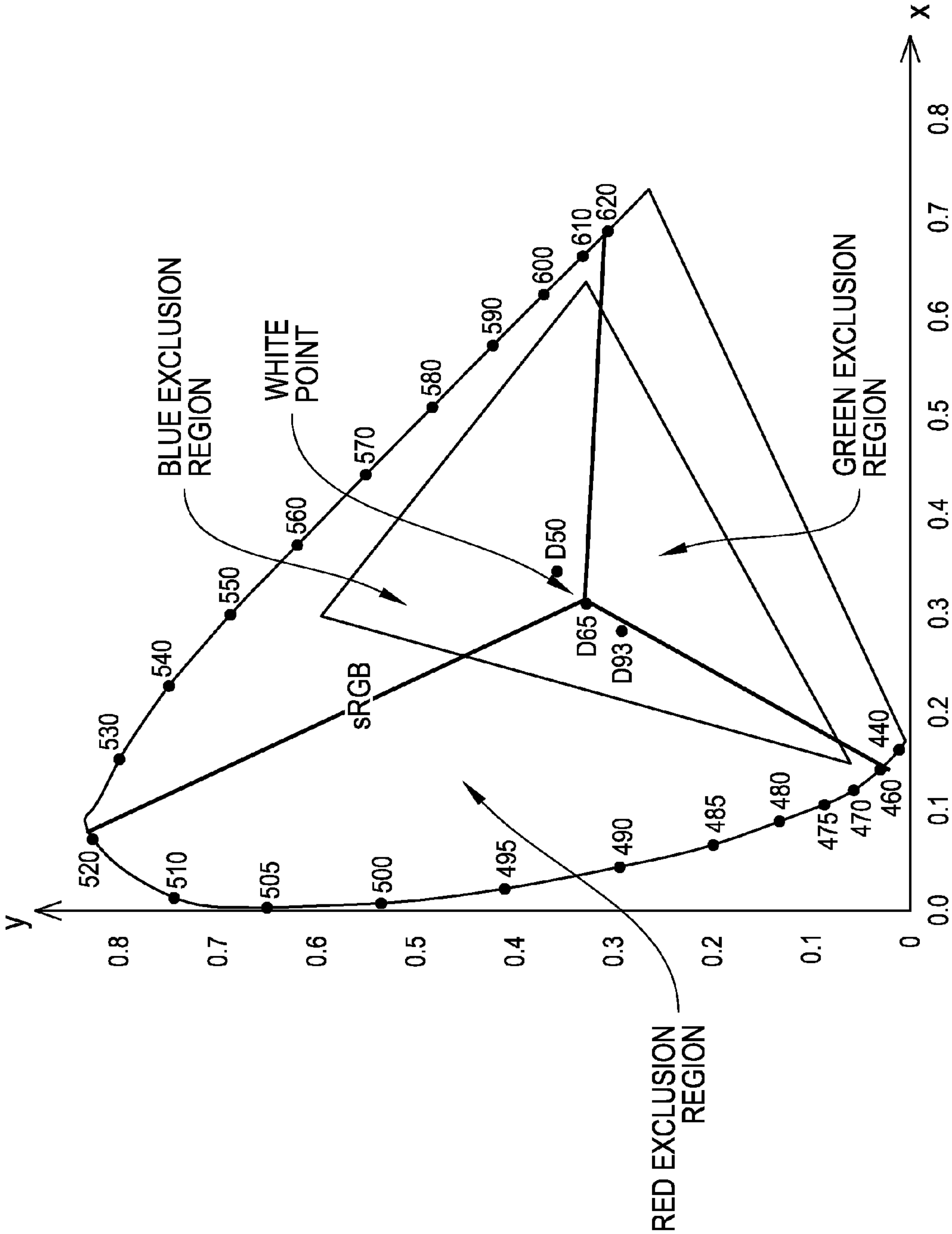
FIG. 14 shows a color gamut of display in the CIE color space segmented for LED selection.

FIG. 14 shows a color gamut of display in the CIE color space segmented for LED selection. Conceptually, the decision as to which non-white LED should be excluded can be described with respect to a color gamut which has been segmented into LED exclusion regions. Each exclusion region includes a set of colors, which if chosen as a FSCC are generated without using a corresponding excluded LED. In one implementation, the boundaries between segments can be set as lines that connect the x, y coordinates in the CIE color space of the LEDs (excluding the white LED) to the white point of the gamut. Each region therefore includes a set of colors in a triangular shape having vertices defined by two LED color coordinates and the white point color coordinates. The excluded LED associated with a region is the LED whose color coordinates do not serve as one of the vertices of the region.

Once the excluded LED is identified, the relative intensities of the two remaining LEDs and the white LED can be calculated by solving the equation:

$$\begin{bmatrix} I_1 \\ I_2 \\ IW \end{bmatrix} = \begin{bmatrix} X_{FSSC} \\ Y_{FSSC} \\ Z_{FSSC} \end{bmatrix} \times \begin{bmatrix} X_{LED1} & X_{LED2} & X_{LEDW} \\ Y_{LED1} & Y_{LED2} & Y_{LEDW} \\ Z_{LED1} & Z_{LED2} & Z_{LEDW} \end{bmatrix}^{-1},$$

where $X_{FSCC}$, $Y_{FSCC}$, and $Z_{FSCC}$ correspond to the tristimulus values of the FSCC, $X_{LED1}$, $Y_{LED1}$, and $Z_{LED1}$ correspond to the tristimulus values of the first LED used to form the FSCC; $X_{LED2}$, $Y_{LED2}$, and $Z_{LED2}$ correspond to the tristimulus values of the second LED used to form the FSCC; $X_{LEDW}$, $Y_{LEDW}$, and $Z_{LEDW}$ correspond to the tristimulus values of the white LED used to form the FSCC; and $I_1$, $I_2$, and $I_W$ correspond to the intensities to which the first, second, and white LEDs are to be illuminated to generate the FSCC.

In some other implementations, instead of dynamically selecting a FSCC for each image frame, a controller, such as the controller 300 shown in FIG. 3, forms images using a set of input contributing colors (ICCs) along with multiple CCCs in each image frame. The ICCs are the colors for which data was received when receiving the image originally, such as red, green and blue (RGB). The CCCs include two or more of yellow, cyan, magenta and white (YCMW).

Figure 15:
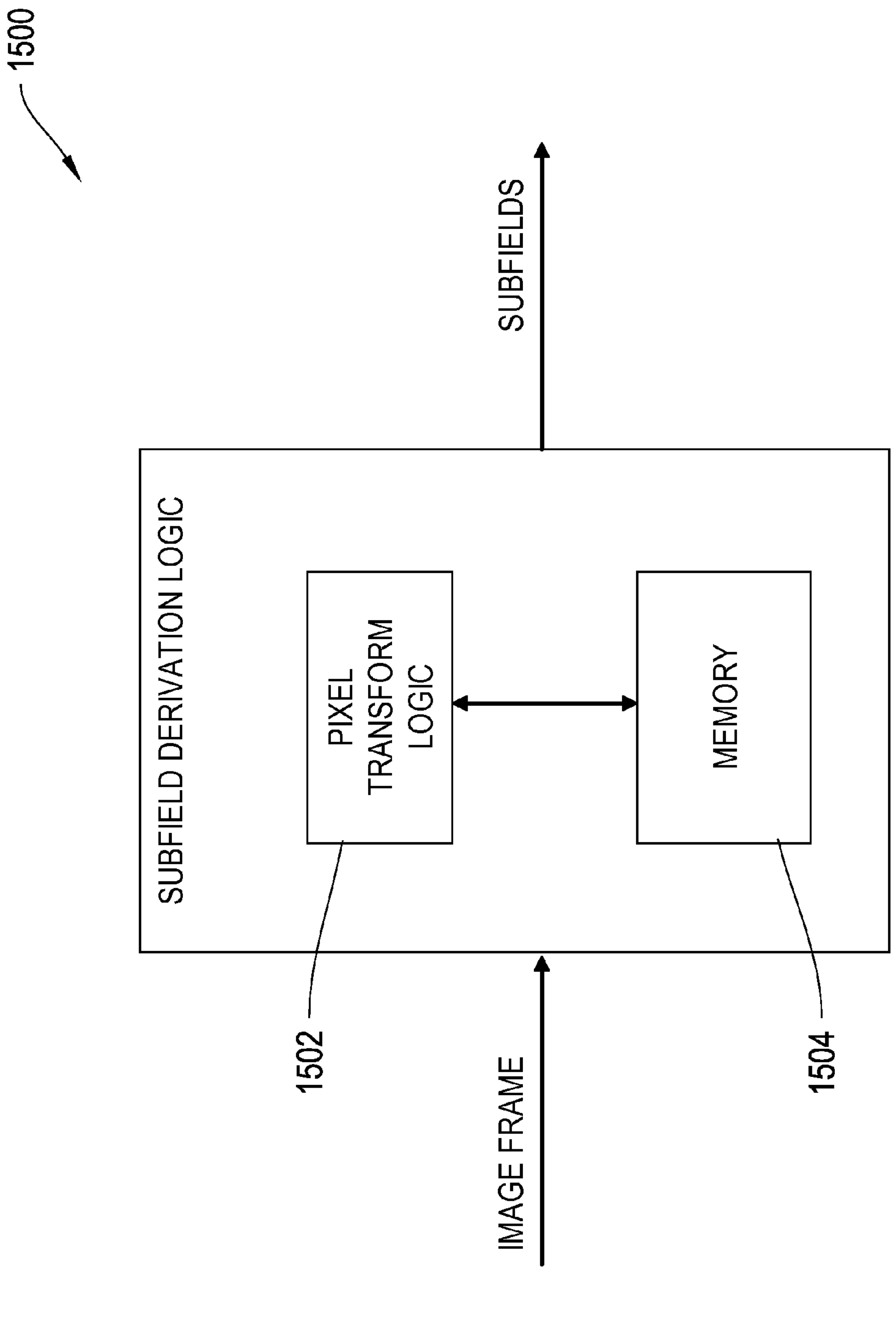
FIG. 15 shows a block diagram of a third subfield derivation logic.

FIG. 15 shows a block diagram of a third subfield derivation logic 1500. The subfield derivation logic 1500 is configured to derivate seven color subfields for each image frame being displayed. Specifically, it generates three ICC subfields, red, green, and blue, and four CCC subfields, yellow, cyan, magenta, and white. The subfield generation logic 1500 includes pixel transform logic 1502 and memory 1504.

Figure 16:
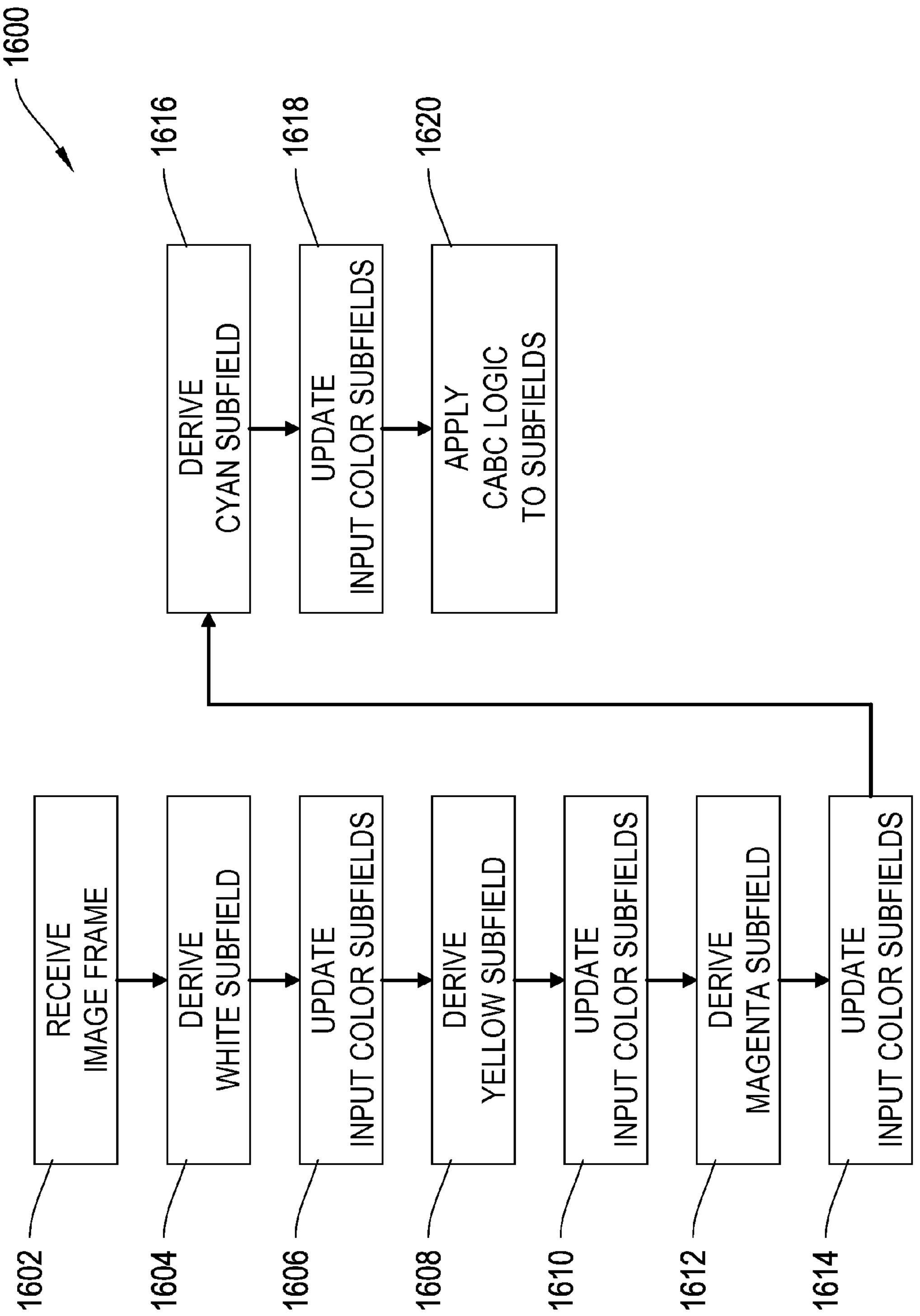
FIG. 16 shows a flow diagram of a process of deriving color subfields using seven contributing colors.

FIG. 16 shows a flow diagram of a process 1600 of deriving color subfields using seven contributing colors. The subfield derivation process 1600 may be executed, for example, by the pixel transform logic 1502 shown in FIG. 15. The process 1600 includes receiving an image frame in the form of a set of ICC subfields (stage 1602), deriving a white subfield (stage 1604), updating the ICC subfields (stage 1606), deriving a yellow subfield (stage 1608), updating the ICC subfields (stage 1610), deriving a magenta subfield (stage 1612), updating the ICC subfields (stage 1614), deriving a cyan subfield (stage 1616) and updating the ICC subfields (stage 1618). The process also includes applying CABC logic to one of more of the input color subfields and/or composite color subfields (stage 1620).

Referring to FIGS. 15 and 16, the subfield derivation process 1600 as set forth above begins with the controller 1500 receiving an image frame (stage 1602). If the image frame is already preprocessed (as described above), the image frame is stored in the memory 1504 in the form of a color subfield associated with each of its ICCs. If the image frame is to undergo preprocessing, it is passed to the pixel transform logic 1502, which performs the preprocessing, and then stores the resulting ICC subfields into memory 1504.

Once a set of ICC subfields are stored in memory 1504, the pixel transform logic 1502 begins generating CCC subfields. As shown in FIG. 16, the pixel transform logic 1502 iteratively generates the CCC subfields, one composite color at a time, in order of the perceived brightnesses of the colors to the HVS. That is, the pixel transform logic 1502 first derives a white subfield (stage 1604), followed by a yellow subfield (stage 1608) and a magenta subfield (stage 1612), and then finally a cyan subfield(stage 1616). After each composite color subfield is generated, the input color subfields are updated accordingly (stages 1606, 1610, 1616, and 1618).

To generate a CCC subfield, the pixel transform logic 1502 evaluates each pixel of image frame to determine how much light intensity can be transferred from the ICC subfields to the CCC subfield. In doing so, the pixel transform logic 1502 can use any of the color replacement strategies described above, including without limitation, using the maximum replacement strategy, a fractional replacement strategy, or a reduced-subframe replacement strategy (with or without dithering). For example, for the white subfield (stage 1604), if using the maximum replacement strategy, the pixel transform logic 1502 obtains the minimum pixel intensity across the ICC subfields for each pixel. The pixel transform logic 1502 stores these minimum intensity values as the intensity values for the respective pixels in the white subfield. The pixel transform logic 1502 then reduces the intensity value for each pixel in each of the ICC subfields by the respective minimum value, thereby updating the input color subfields (stage 1606).

For the remaining CCC subfields, i.e., for the yellow, cyan, and magenta subfields, the pixel transform logic 1502 performs a similar process. However, instead of setting the pixel intensity values in these subfields equal to the minimum pixel intensity values across all subfields, the pixel transform logic 1502 sets the remaining subfield intensity values to the minimum pixel intensity values for each pixel in the subfields for the two input colors which, when combined, form the corresponding CCC.

As indicated above, the pixel transform logic can use any of the replacement strategies described herein in identifying the appropriate subfield intensity values for each composite color. The reduced-subframe strategy can be particularly effective when using multiple composite colors, as otherwise the number of subframes used to form an image could quickly become untenable. Thus, in some implementations, the subfield derivation logic 1500 is configured to derive CCC subfields assuming the use of only 2 or 3 higher-weighted subframes for each CCC.

Consider the following example using a reduced-subframe replacement strategy. Assume an 8-bit-per-color ICC grayscale scheme, using 2 higher-weighted subframes for each CCC subfield with weights of 128 and 64, respectively. Further assume a pixel having input color intensity values of Red 200, Green 150, and Blue 100.

According to the process 1600 shown in FIG. 16, after receiving the frame including the pixel, the pixel transform logic 1502 derives a white subfield (stage 1604). For the example pixel, the pixel transform logic would identify 64 as the greatest intensity that can be replaced with white, given only two higher-weighted subframes to work with. Thus, the pixel transform logic would set the value for the pixel in the white subfield to 64. It would then adjust the intensity values for the pixel in the ICC subfields, by reducing the respective values by 64 to Red 136, Green 86, and Blue 36.

After applying the same process to each pixel in the image frame, the pixel transform logic 1502 would then proceed to derive intensity values for the pixels for the yellow subfield. For the example pixel, the pixel transform logic identifies the maximum intensity value it can replace in both the red and green subfields. The pixel transform logic 1502 therefore sets the intensity value for the pixel in the yellow subfield to 64. The intensity values for the pixel in the input color subfields are reduced to Red 72, Green 22 and Blue 36.

For each of the cyan and magenta subfields, the pixel transform logic 1502 would identify a replacement intensity value for the pixel of 0, because the intensity value for the pixel in the blue subfield (blue being a component of both magenta and cyan) is less than the weight of the lowest weight subframe available for either color. Accordingly, the intensity values for the pixel in each of the color subfields would be Red 72, Green 22, Blue 36, White 64, Yellow 64, Magenta 0, and Cyan 0.

Consider another example pixel having input color intensity values of Red 75, Green 150, and Blue 225. As above, the pixel transform logic 1502 begins with identifying an intensity value for the pixel for the white subfield. For the example pixel, the pixel transform logic selects 64. The ICC subfields are adjusted, leaving intensity values for the pixel of Red 11, Green 86, and Blue 161. The pixel transform logic 1502 continues by identifying a 0 intensity for the yellow and magenta subfields, given the low remaining intensity for the pixel in the red subfield. A value of 64 is then selected for the Cyan subfield. The intensity values for the pixel thus are Red 11, Green 22, Blue 97, White 64, Yellow 0, Magenta 0, and Cyan 64.

In still another example, consider a pixel having input intensity values of Red 20, Green 200, and Blue 150. For this pixel, there is insufficient intensity in the red subfield to allocate any intensity to the white, yellow, or magenta subfields. The pixel transform logic 1502, however, can allocate an intensity of 128 to the cyan subfield, yielding pixel intensity values of Red 20, Green 72, Blue 22, White 0, Yellow 0, Magenta 0, and Cyan 128.

In some implementations, a dithering algorithm is applied to each component color subfield before the ICC subfields are updated. For example, dithering stages can be interposed between stages 1604 and 1606, 1608 and 1610, 1612 and 1614, and 1616 and 1618.

In some implementations, the order in which the pixel transform logic 1502 derives the CCC subfields can be different. In some other implementations, the pixel transform logic 1502 only generates subfields for two or three of the composite colors. In some such implementations, the two composite colors can be selected in advance for use with each and every image frame.

In some other implementations, multiple composite colors can be selected dynamically for each image frame using any of the FSCC selection processes described above, effectively resulting in two or more FSCCs. To select multiple FSCCs, in one implementation, after a subfield derivation logic identifies a first FSCC, derives its subfield and adjusts the FICC subfields accordingly, the subfield derivation logic reevaluates the adjusted FICC subfields to identify a second FSCC.

In some other implementations, the power management functionality described in relation to FIGS. 10 and 11 can be applied to a multiple CCC image formation process, such as the process 1600 of FIG. 16. In such implementations, each color subfield is modified according to CABC logic. The subfield derivation logic 1600 then determines a differential power consumption between displaying an image frame using only the CABC-modified original ICC subfields with the displaying the image using the larger set of CABC-modified CCC subfields and updated ICC subfields. The subfield derivation logic then proceeds to form the image using the set of subfields justified by the power differential.

In some other implementations, a controller, such as controller 300 can be configured to operate in at least two operating modes that use different ones of the multi-CCC image formation processes described above. The controller may switch between the operating modes based on user input, received image data, instruction from a host device, and/or one or more other factors.

Figure 17:
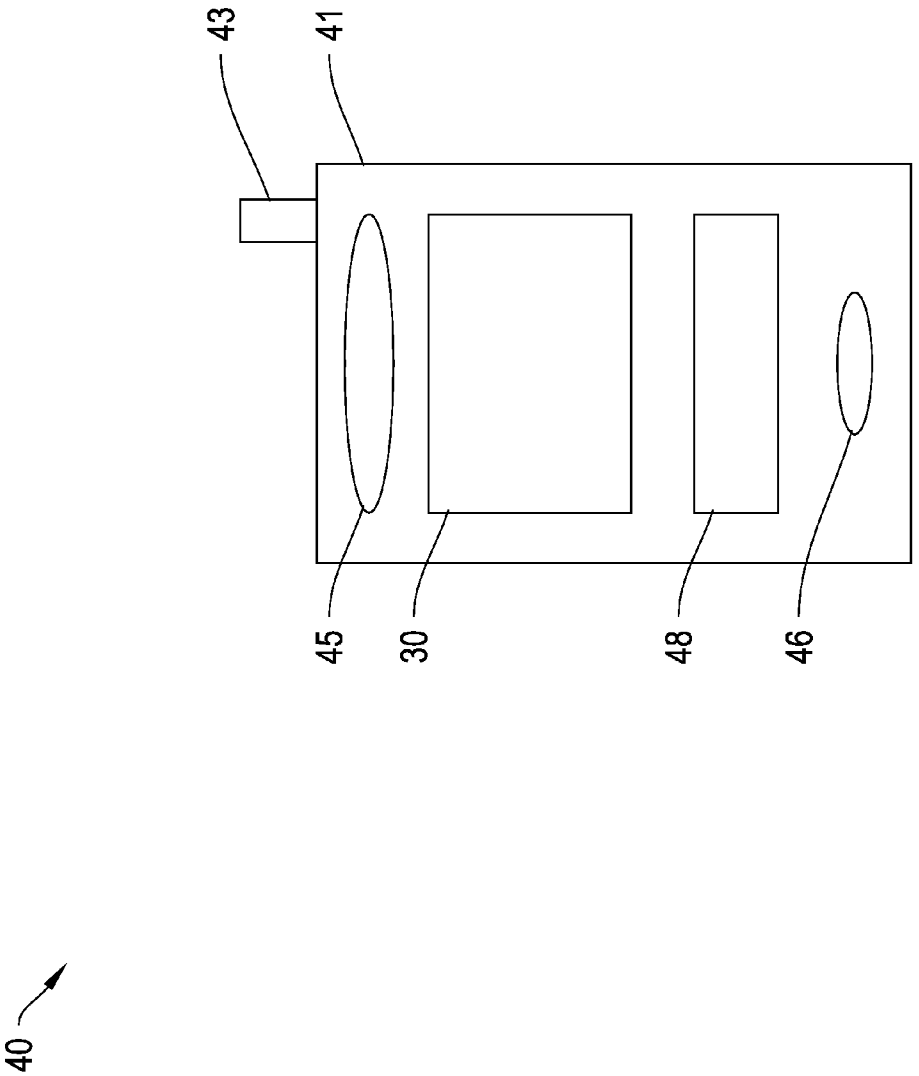
FIGS. 17 and 18 show system block diagrams illustrating a display device that includes a plurality of display elements.
Figure 18:
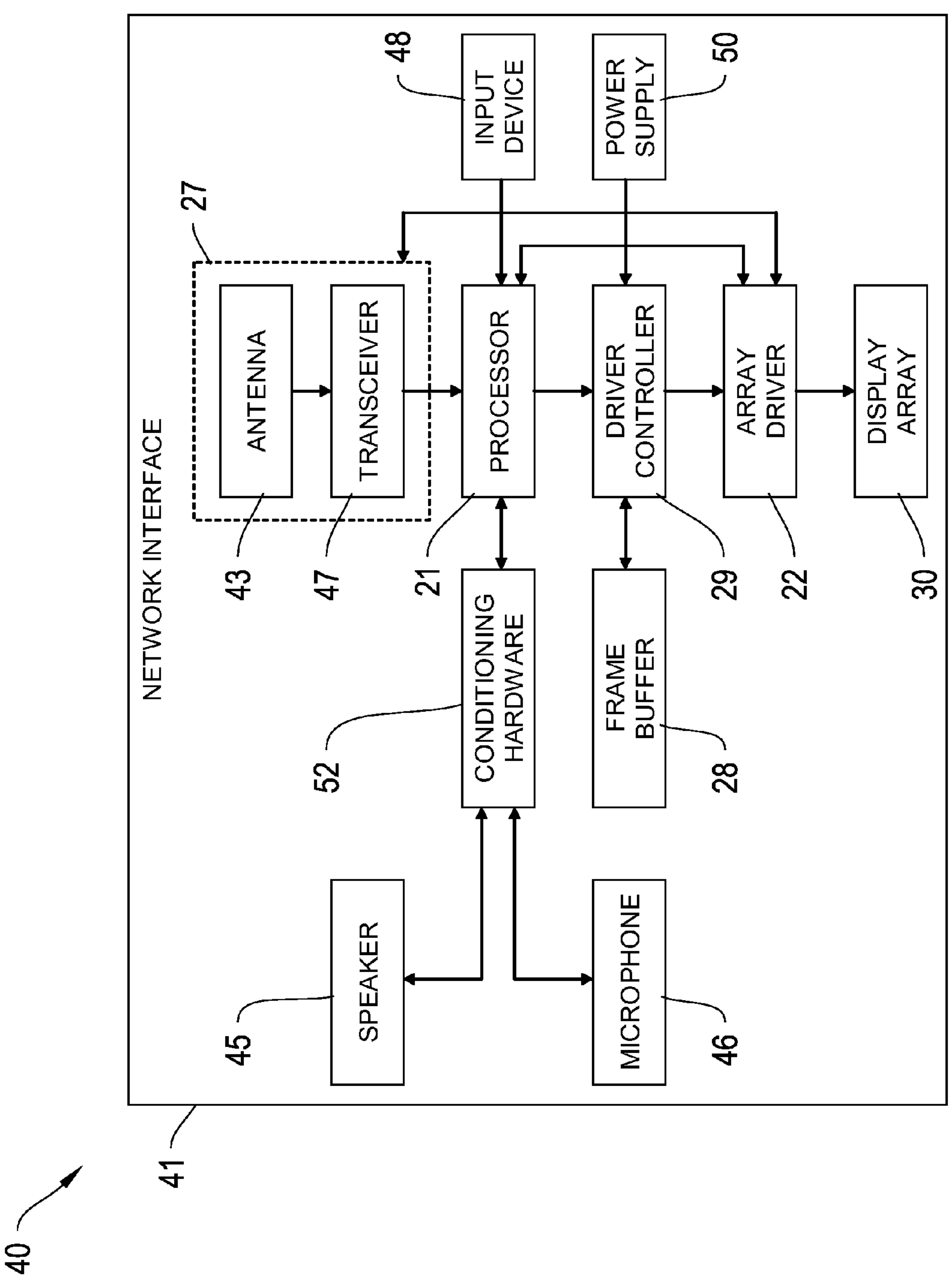

FIGS. 17 and 18 show system block diagrams illustrating a display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, electroluminescent (EL) displays, OLED, super-twisted nematic (STN) display, LCD, or thin-film transistor (TFT) LCD, or a non-flat-panel display, such as a cathode ray tube (CRT) or other tube device. In addition, the display 30 can include a mechanical light modulator-based display, as described herein.

The components of the display device 40 are schematically illustrated in FIG. 17. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. In some implementations, the functions of the various implementations of the controller 300 shown in FIG. 3 may be carried out by a combination of the processor 21 and the driver controller 29. One or more elements in the display device 40, including elements not specifically depicted in FIG. 17, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22 and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as a mechanical light modulator display element controller). Additionally, the array driver 22 can be a conventional driver or a bi-stable display driver (such as a mechanical light modulator display element controller). Moreover, the display array 30 can be a conventional display array or a bi-stable display array (such as a display including an array of mechanical light modulator display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:

an input configured to receive image data corresponding to a current image frame;

contributing color selection logic configured to process the received image data, to identify a frame-specific contributing color (FSCC)), based on the color content of the current image frame, for use in conjunction with a set of frame-independent contributing colors (FICCs) to generate a subsequent image frame on a display, wherein the contributing color selection logic is configured to:

obtain an FSCC for the current image frame by retrieving a FSCC identified by the contributing color selection logic based on the color content of a previous image frame; and identify the FSCC for use in the subsequent image frame such that the FSCC identified for the subsequent image frame is less than a threshold color change from the FSCC used in the current image frame; and subframe generation logic configured to process the received image data for the current image frame to generate at least two subframes for each of the FICCs and the obtained FSCC such that an output by the display of the generated subframes results in the display of the current image frame.

2. The apparatus of claim 1, wherein the contributing color selection logic is configured to identify the FSCC for use in the subsequent image frame by determining which of a plurality of potential FSCCs is most prevalent in the current image frame.

3. The apparatus of claim 2, wherein the contributing color selection logic is configured to determine a prevalence of a potential FSCC in an image frame based on the relative brightness of each of the potential FSCCs.

4. The apparatus of claim 1, wherein the contributing color selection logic is configured to identify the FSCC for use in the subsequent image frame by selecting between a plurality of potential FSCCs consisting of combinations of equal levels of at least two of the FICCs.

5. The apparatus of claim 4, wherein the FICCs consist of red, green and blue (RGB) and the FSCC is selected from the group of colors consisting of yellow, cyan, magenta, and white (YCMW).

6. The apparatus of claim 1, wherein the contributing color selection logic is configured to locate a set of median tristimulus values associated with a subset of the pixels in the current image frame.

7. The apparatus of claim 6, wherein the subset of pixels includes pixels in the current image frame having a luminance value that is greater than or equal to about the mean luminance value of all pixels in the current image frame.

8. The apparatus of claim 6, wherein the contributing color selection logic is configured to identify one of a preselected set of FSCCs having a distance in a color space closest to the color in the color space corresponding to the set of median tristimulus values.

9. The apparatus of claim 6, wherein the contributing color selection logic is configured to compare a distance between a color corresponding to the set of median tristimulus values and one of a boundary of a color gamut and a color gamut white point.

10. The apparatus of claim 9, wherein the contributing color selection logic is configured to, in response to determining that the distance between the color corresponding to the set of the median tristimulus values and the boundary of the color gamut falls below a color distance threshold, identify as the FSCC a point on the boundary of the color gamut.

11. The apparatus of claim 9, wherein the contributing color selection logic is configured to, in response to determining that the distance between the color corresponding to the set of the median tristimulus values and the white point falls below a color distance threshold, identify the white point as the FSCC.

12. The apparatus of claim 1, wherein in response to determining that a color change between the FSCC identified for the subsequent image frame and the FSCC for the current image frame is greater than the threshold, the contributing color selection logic is configured to select a FSCC for the subsequent image frame with a lesser color change with respect to the FSCC used for the current image frame.

13. The apparatus of claim 12, wherein the contributing color selection logic is configured to calculate the color change between the FSCC identified for the subsequent image frame and the FSCC used in the current frame by separately calculating the differences between intensities of the FICC components in the FSCCs.

14. The apparatus of claim 12, wherein the contributing color selection logic is configured to calculate the color change between the FSCC identified for the subsequent image frame and the FSCC used in the current frame by calculating a Euclidean distance between the FSCCs in one of a tristimulus color space and a CIE color gamut.

15. The apparatus of claim 1, wherein the apparatus is configured to derive the subframes for at least one FICC by:
- deriving a color subfield for the obtained FSCC based on an initial set of FICC subfields;
- adjusting the initial set of FICC subfields based on the derived FSCC subfield; and
- generating the subframes for the FICC based on the adjusted FICC color subfield.

16. The apparatus of claim 15, wherein the subframe generation logic is configured to generate a greater number of subframes for each of the FICCs than for the obtained FSCC.

17. The apparatus of claim 16, wherein the subframe generation logic is configured to generate subframes for each of the FICCs according to a non-binary subframe weighting scheme.

18. The apparatus of claim 17, wherein the subframe generation logic is configured to generate each of the subframes corresponding to the FSCC according to a binary subframe weighting scheme.

19. The apparatus of claim 15, comprising subfield derivation logic configured to derive the FSCC subfield and to adjust the initial set of FICC subfields based on the derived FSCC subfield.

20. The apparatus of claim 19, wherein the subfield derivation logic is configured to determine a pixel intensity value for a pixel in the FSCC subfield by identifying the minimum intensity value for the pixel across the initial set of FICC subfields, and wherein the initial set of FICC subfields includes subfields for each of the FICCs which combine to form the FSCC.

21. The apparatus of claim 19, wherein the subfield derivation logic is further configured to determine the pixel intensity value for a pixel in the FSCC subfield by rounding the identified minimum intensity value down to an intensity value that can be displayed using fewer subframes than are used to display the FICC subfields, and wherein the subframes for the FSCC each have weights greater than 1.

22. The apparatus of claim 19, wherein the subfield derivation logic is configured to determine pixel intensity values for the FSCC subfield by:
- calculating an initial FSCC intensity level for each pixel in the image frame for the obtained FSCC based on the received image; and
- applying a spatial dithering algorithm to the calculated initial FSCC intensity levels.

23. The apparatus of claim 20, wherein the subfield derivation logic is configured to determine pixel intensity values for the FSCC subfield by scaling the pixel intensity values of at least one of the derived FSCC subfield and the updated FICC subfields using content adaptive backlight control (CABC) logic.

24. The apparatus of claim 1, further comprising:
- the display, wherein the display includes a plurality of display elements;
- a processor that is configured to communicate with the display, the processor configured to process image data; and
- a memory device that is configured to communicate with the processor.

25. The apparatus of claim 24, further comprising:
- a driver circuit configured to send at least one signal to the display; and
- a controller, including the contributing color selection logic and the subframe generation logic, configured to send at least a portion of the image data to the driver circuit.

26. The apparatus of claim 25, further comprising an image source module configured to send the image data to the processor, wherein the image source module includes at least one of a receiver, transceiver, and transmitter.

27. The apparatus of claim 26, further comprising:
- an input device configured to receive input data and to communicate the input data to the processor.

28. A non-transitory computer readable medium storing computer executable instructions, which when executed, cause a processor to:
- receive image data corresponding to a current image frame;
- process the received image data to identify a frame-specific contributing color (FSCC)), based on the color content of the current image frame, for use in conjunction with a set of frame-independent contributing colors (FICCs) to generate a subsequent image frame on a display by:
  - obtaining an FSCC for the current image frame by retrieving a FSCC identified based on the color content of a previous image frame; and
  - identifying the FSCC for use in the subsequent image frame such that the FSCC identified for the subsequent image frame is less than a threshold color change from the FSCC used in the current image frame; and
- process the received image data for the current image frame to generate at least two subframes for each of the FICCs and the obtained FSCC such that an output by the display of the generated subframes results in the display of the current image frame.

29. The non-transitory computer readable medium of claim 28, wherein the computer executable instructions cause the processor to identify the FSCC for use in the subsequent image frame by determining which of a plurality of potential FSCCs is most prevalent in the current image frame.

30. The non-transitory computer readable medium of claim 29, wherein the computer executable instructions cause the processor to determine a prevalence of a potential FSCC in an image frame based on the relative brightness of each of the potential FSCCs.

31. The non-transitory computer readable medium of claim 28, wherein the computer executable instructions cause the processor to identify the FSCC for use in the subsequent image frame by selecting between a plurality of potential FSCCs consisting of combinations of equal levels of at least two of the FICCs.

32. The non-transitory computer readable medium of claim 31, wherein the FICCs consist of red, green and blue (RGB) and the FSCC is selected from the group of colors consisting of yellow, cyan, magenta, and white (YCMW).

33. The non-transitory computer readable medium of claim 28, wherein the computer executable instructions cause the processor to locate a set of median tristimulus values associated with a subset of the pixels in the current image frame.

34. The non-transitory computer readable medium of claim 33, wherein the subset of pixels includes pixels in the current image frame having a luminance value that is greater than or equal to about the mean luminance value of all pixels in the current image frame.

35. The non-transitory computer readable medium of claim 33, wherein the computer executable instructions cause the processor to identify one of a preselected set of FSCCs having a distance in a color space closest to the color in the color space corresponding to the set of median tristimulus values.

36. The non-transitory computer readable medium of claim 33, wherein the computer executable instructions cause the processor to compare a distance between a color corresponding to the set of median tristimulus values and one of a boundary of a color gamut and a color gamut white point.

37. The non-transitory computer readable medium of claim 36, wherein the computer executable instructions cause the processor to, in response to determining that the distance between the color corresponding to the set of the median tristimulus values and the boundary of the color gamut falls below a color distance threshold, identify as the FSCC a point on the boundary of the color gamut.

38. The non-transitory computer readable medium of claim 36, wherein the computer executable instructions cause the processor to, in response to determining that the distance between the color corresponding to the set of the median tristimulus values and the white point falls below a color distance threshold, identify the white point as the FSCC.

39. The non-transitory computer readable medium of claim 28, wherein in response to the processor determining that a color change between the FSCC identified for the subsequent image frame and the FSCC for the current image frame is greater than the threshold, the computer executable instructions cause the processor to select a FSCC for the subsequent image frame with a lesser color change with respect to the FSCC used for the current image frame.

40. The non-transitory computer readable medium of claim 39, wherein the computer executable instructions cause the processor to calculate the color change between the FSCC identified for the subsequent image frame and the FSCC used in the current frame by separately calculating the differences between intensities of the FICC components in the FSCCs.

41. The non-transitory computer readable medium of claim 39, wherein the computer executable instructions cause the processor to calculate the color change between the FSCC identified for the subsequent image frame and the FSCC used in the current frame by calculating a Euclidean distance between the FSCCs in one of a tristimulus color space and a CIE color gamut.

42. The non-transitory computer readable medium of claim 28, wherein the computer executable instructions cause the processor to derive the subframes for at least one FICC by:

- deriving a color subfield for the obtained FSCC based on an initial set of FICC subfields;
- adjusting the initial set of FICC subfields based on the derived FSCC subfield; and
- generating the subframes for the FICC based on the adjusted FICC color subfield.

43. The non-transitory computer readable medium of claim 42, wherein the computer executable instructions cause the processor to generate a greater number of subframes for each of the FICCs than for the obtained FSCC.

44. The non-transitory computer readable medium of claim 42, wherein the computer executable instructions cause the processor to generate subframes for each of the FICCs according to a non-binary subframe weighting scheme.

45. The non-transitory computer readable medium of claim 44, wherein the computer executable instructions cause the processor to generate each of the subframes corresponding to the FSCC according to a binary subframe weighting scheme.

46. The non-transitory computer readable medium of claim 42, wherein the computer executable instructions cause the processor to derive the FSCC subfield and to adjust the initial set of FICC subfields based on the derived FSCC subfield.

47. The non-transitory computer readable medium of claim 46, wherein the computer executable instructions cause the processor to determine a pixel intensity value for a pixel in the FSCC subfield by identifying the minimum intensity value for the pixel across the initial set of FICC subfields, and wherein the initial set of FICC subfields includes subfields for each of the FICCS which combine to form the FSCC.

48. The non-transitory computer readable medium of claim 47, wherein the computer executable instructions cause the processor to determine the pixel intensity value for a pixel in the FSCC subfield by rounding the identified minimum intensity value down to an intensity value that can be displayed using fewer subframes than are used to display the FICC subfields, and wherein the subframes for the FSCC each have weights greater than 1.

49. The non-transitory computer readable medium of claim 44, wherein the computer executable instructions cause the processor to determine pixel intensity values for the FSCC subfield by:

- calculating an initial FSCC intensity level for each pixel in the image frame for the obtained FSCC based on the received image; and
- applying a spatial dithering algorithm to the calculated initial FSCC intensity levels.

50. The non-transitory computer readable medium of claim 44, wherein the computer executable instructions cause the processor to determine pixel intensity values for the FSCC subfield by scaling the pixel intensity values if at least one of the derived FSCC subfield and the updated FICC subfields using content adaptive backlight control (CABC) logic.

* * * * *